United States Patent [19]

Higgins

[11] Patent Number: 4,625,330
[45] Date of Patent: Nov. 25, 1986

[54] VIDEO ENHANCEMENT SYSTEM

[75] Inventor: Raymond L. Higgins, Waterloo, Canada

[73] Assignee: NCR Corporation, Dayton, Ohio

[21] Appl. No.: 562,787

[22] Filed: Dec. 19, 1983

[51] Int. Cl.[4] .............................................. G06K 9/40
[52] U.S. Cl. ...................................... 382/27; 382/50; 382/54
[58] Field of Search ....................... 382/55, 54, 52, 27, 382/4; 358/166, 167, 284

[56] References Cited

U.S. PATENT DOCUMENTS

| | | | |
|---|---|---|---|
| 3,737,855 | 6/1973 | Cutaia | 382/54 |
| 4,003,024 | 1/1977 | Riganati et al. | 340/146.3 H |
| 4,083,035 | 4/1978 | Riganati et al. | 382/27 |
| 4,156,230 | 5/1979 | Riganati et al. | 382/4 |
| 4,162,482 | 7/1979 | Su | 382/55 |
| 4,204,232 | 5/1980 | Mizuno | 382/55 |
| 4,225,850 | 9/1980 | Chang et al. | 382/4 |
| 4,345,314 | 8/1982 | Melamud et al. | 382/51 |

*Primary Examiner*—Leo H. Boudreau
*Attorney, Agent, or Firm*—Wilbert Hawk, Jr.; Albert L. Sessler, Jr.; Elmer Wargo

[57] ABSTRACT

A system and method are disclosed for enhancing analog video pulses. In a preferred embodiment of the invention, raw video pulses from a video camera are each converted into a multi-bit signal having an associated one of eight levels of quantization. Scans of multi-bit signals are selectively stored in an array of shift registers to form a preselected configuration of multi-bit signals, including a multi-bit center signal. The center signal is compared with the two multi-bit signals to its left, to its right, above it and below it in four respective PROMs to determine if the center signal is possibly one of the two or three highest level multi-bit signals of a character segment. Four-bit comparison codes (left and right horizontal codes and above and below vertical codes) are respectively outputted from these four PROMs. The right and left horizontal codes are compared in a horizontal axis decision PROM, while the above and below vertical codes are compared in a vertical axis decision PROM. In response to these comparisons the horizontal and vertical axis decision PROMs respectively determine again if that center signal is possibly one of the two or three highest level multi-bit signals of a character segment. Four-bit outputs from the axis decision PROMs are compared in an output PROM which decides whether the center signal should be a first or a second binary value.

5 Claims, 18 Drawing Figures

WHITE (0)

| 0 | 0 | 0 | 3 | 6 |
| 0 | 0 | 0 | 3 | 6 |
| 0 | 0 | 0 | 3 | 6 |
| 0 | 0 | 0 | 3 | 6 |
| 0 | 0 | 0 | 3 | 6 |

WHITE (0)

| 6 | 6 | 6 | 6 | 4 |
| 2 | 2 | 2 | 6 | 4 |
| 0 | 0 | 2 | 6 | 5 |
| 0 | 0 | 1 | 6 | 5 |
| 0 | 0 | 0 | 6 | 5 |

END OF SEGMENT (1)

| 0 | 2 | 5 | 2 | 0 |
| 0 | 2 | 5 | 2 | 0 |
| 0 | 1 | 3 | 1 | 0 |
| 0 | 0 | 0 | 0 | 0 |
| 0 | 0 | 0 | 0 | 0 |

SEGMENT (2)

| 0 | 2 | 6 | 6 | 3 |
| 0 | 2 | 5 | 6 | 2 |
| 0 | 2 | 4 | 6 | 3 |
| 0 | 2 | 4 | 6 | 1 |
| 0 | 0 | 2 | 3 | 0 |

FIG. 8E
HALF SEGMENT (3)

|   |   |   |   |   |
|---|---|---|---|---|
| 1 | 3 | 6 | 5 | 4 |
| 1 | 3 | 6 | 5 | 4 |
| 0 | 2 | 5 | 5 | 3 |
| 0 | 2 | 3 | 3 | 2 |
| 0 | 0 | 3 | 1 | 0 |

FIG. 8F
REMOVE IF BORDER (4)

|   |   |   |   |   |
|---|---|---|---|---|
| 5 | 5 | 5 | 5 | 6 |
| 4 | 5 | 4 | 4 | 5 |
| 3 | 3 | 3 | 3 | 3 |
| 2 | 3 | 3 | 2 | 2 |
| 0 | 1 | 1 | | 0 |

FIG. 8G
POSSIBLE CORNER (5) AND POSSIBLE CORNER AND REMOVE IF BORDER (6)

|   |   |   |   |   |
|---|---|---|---|---|
| 0 | 4 | 5 | 2 | 0 |
| 3 | 4 | 5 | 2 | 0 |
| 4 | 4 | 4 | 2 | 0 |
| 1 | 0 | 0 | 0 | 0 |
| 0 | 0 | 0 | 0 | 0 |

FIG. 8H
NO DECISION (8)

|   |   |   |   |   |
|---|---|---|---|---|
| 3 | 3 | 3 | 3 | 3 |
| 2 | 2 | 2 | 2 | 2 |
| 0 | 1 | 1 | 1 | 1 |
| 0 | 0 | 0 | 0 | 0 |
| 0 | 0 | 0 | 0 | 0 |

FIG. 8I
THIN DARK SEGMENT (A)

|   |   |   |   |   |
|---|---|---|---|---|
| 7 | 7 | 7 | 7 | 2 |
| 5 | 5 | 6 | 6 | 2 |
| 0 | 0 | 4 | 6 | 2 |
| 0 | 0 | 0 | 6 | 2 |
| 0 | 0 | 0 | 4 | 2 |

FIG. 8J
BLACK (F)

|   |   |   |   |   |
|---|---|---|---|---|
| 0 | 4 | 7 | 2 | 0 |
| 0 | 4 | 7 | 2 | 0 |
| 0 | 4 | 7 | 2 | 0 |
| 0 | 4 | 7 | 2 | 0 |
| 0 | 4 | 7 | 2 | 0 |

FIG. 8K
BLACK (F)

|   |   |   |   |   |
|---|---|---|---|---|
| 0 | 4 | 7 | 2 | 2 |
| 0 | 4 | 7 | 2 | 2 |
| 0 | 4 | 7 | 2 | 2 |
| 0 | 4 | 7 | 2 | 2 |
| 0 | 4 | 7 | 2 | 2 |

VIDEO ENHANCEMENT SYSTEM

BACKGROUND OF THE INVENTION

1. Field of the Invention

This invention generally relates to optical character reader (OCR) systems and more particularly to an improved video enhancement system for enabling an optical character reader to accurately read OCR print with inconsistent print contrast.

2. Description of the Prior Art

In recent years optical character recognition (OCR) systems have been employed to automatically read and electrically process hand-printed or machine-printed alphanumeric characters on documents for data processing purposes.

An OCR system generally detects a character on a document by detecting the contrast between that character and its background paper. This detection of characters is usually accomplished by optically scanning an illuminated document containing characters to be read in order to produce a matrix of picture elements or pixels representative of the optical image of the document.

Before characters can be identified, the matrix of pixels must be changed into some type of machine-readable form. Generally, these pixels are quantized so that they can be more readily processed by subsequent data processing equipment.

A first type of system quantizes the pixels to two binary levels to derive binary pixel data by establishing a threshold level against which each pixel in the matrix is compared. Those pixels equal to or greater than the threshold level are assigned a binary "1" value representative of a black data bit, while those pixels below the threshold value are assigned a binary "0" value representative of a white data bit. Some systems then apply the black and white pixel data to subsequent data processing equipment to identify the characters on a document. However, many systems subsequently apply the matrix of black and white pixel data to an enhancement circuit to simplify and help to achieve more accurate results in the subsequent character recognition operation. Such enhancement circuits usually perform line-thinning and/or line-filling operations to cause the scanned character to become a skeletal representative of the character, which may be two or three pixels wide, while still retaining the basic geometrical information of the original character. Exemplary line-thinning and/or line-filling enhancement techniques on two-dimensional black/white binary data are shown in U.S. Pat. Nos. 3,737,855; 4,003,024; and 4,162,482.

A second type of system uses two threshold levels to quantize the pixels into three digital levels to develop black, gray and white pixel data to try to compensate for different print contrast signals encountered in OCR reading. The term "print contrast signal" (PCS) relates to the contrast between the printed image and the background paper of a document. A printed image with a high PCS is very dark and is best read with a high threshold setting. On the other hand, a printed image with a low PCS is very light and is best read with a low threshold level. This second type of system which quantizes pixels to three levels applies the resultant three-level pixel data to an enhancement circuit to achieve line-thinning and line-filling operations before converting the three-level pixel data into black and white pixel data.

The above-described first and second types of systems can very accurately read batches of OCR imprinted documents if the PCS is consistent from document to document, from character to character and within each character. Unfortunately, a batch of documents will often contain documents with different PCS. A single document can have OCR print that has been encoded by two or more different printers, so PCS variations can be encountered between characters on the same document. PCS variations within a single character are also often encountered with very poor OCR print quality. Inconsistent PCS from document to document, from character to character, and within a character all result in poor readability using just two or even three levels of quantization before enhancement.

The background art known to applicant at the time of the filing of this application is as follows:

U.S. Pat. No. 3,737,855, Character Video Enhancement System, by A. Cutaia;

U.S. Pat. No. 4,003,024, Two-Dimensional Binary Data Enhancement System, by J. P. Riganati et al;

U.S. Pat. No. 4,162,482, Pre-Processing and Feature Extraction System for Character Recognition, by Chanchang Su; and U.S. Pat. No. 4,345,314, Dynamic Threshold Device, by R. C. Melamud et al.

SUMMARY OF THE INVENTION

Briefly, an improved video enhancement system is disclosed for quantizing and enhancing input two-dimensional pixel data. In a preferred embodiment of the invention an analog-to-digital converter quantizes to one of eight discrete levels each pixel signal in successive scans of pixel signals representative of a scanned character image. A 3-bit pixel signal from the converter indicates the digital amplitude of each pixel signal. Successive scans of quantized 3-bit pixel signals are shifted into an array of shift registers to form a preselected configuration of 3-bit pixel signals, including a 3-bit center pixel signal C, at each SHIFT pulse time. Each center pixel signal C is selectively compared in a first group of four PROMs with the associated two pixel signals left of C, right of C, above C and below C. Each PROM in the first group outputs a 4-bit code as a function of its decision on whether C could be part of a line segment and, if so, on which part of a line segment. The 4-bit codes from the first group of four PROMs are selectively compared in horizontal and vertical axis decision PROMs. Each axis decision PROM outputs a 4-bit code as a function of its decision on whether or not C is on a segment. A final PROM compares the two 4-bit codes from the axis decision PROMs and accordingly decides whether C should be a first or a second binary value.

It is therefore an object of this invention to provide an improved video enhancement system and method therefor.

Another object of this invention is to provide a system and method for enhancing scans of pixel signals by first quantizing those pixel signals to multi-bit levels and then enhancing those quantized multi-bit pixel signals before turning them into binary black and white signals.

A further object of this invention is to provide an improved system and method for accurately reading OCR print with inconsistent print contrast.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein:

FIGS. 7 and 8A–8K are data distribution representations useful in explaining the data comparison PROMs of FIG. 6.

DESCRIPTION OF THE PREFERRED EMBODIMENT

It should be noted at this time that, throughout this description of the preferred embodiment, the presence of a slash (/) following either a symbol or an acronym represents the logical inversion of that symbol or acronym.

Figure 1:
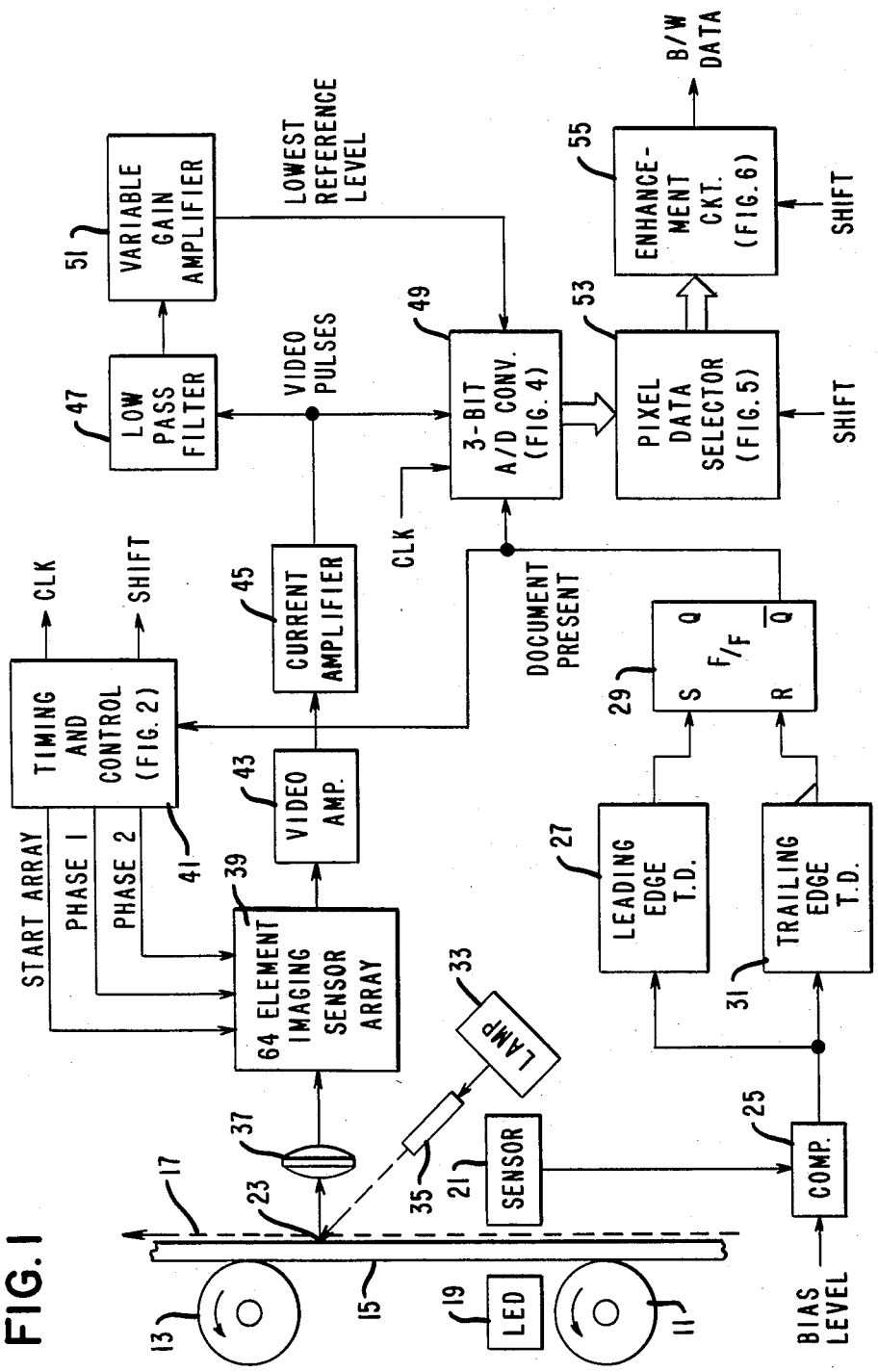
FIG. 1 illustrates a schematic block diagram of a preferred embodiment of the invention incorporated into an OCR (optical character recognition) reader system.

Referring now to the drawings, FIG. 1 illustrates a preferred embodiment of the invention incorporated into an OCR (optical character recognition) reader system. Rollers 11 and 13 feed a document 15 along a path 17 (designated by a dashed line headed by an arrowhead) between a LED (light emitting diode) 19 and a phototransistor or sensor 21 and past a scan position 23.

The LED 19 and sensor 21 are physically mounted along the path 17 of the document 15 at a position approximately 12 millimeters before the scan position 23 and cooperate to detect the leading and trailing edges of the document 15.

As the document 15 moves along the path 17, it breaks the light path between the LED 19 and sensor 21, causing the sensor 21 to generate a high sensor signal. This high sensor signal is compared to a preselected bias level by a comparator 25. Since the presence of a document 15 between the LED 19 and sensor 21 causes the high sensor signal to exceed the bias level, the comparator 25 outputs a high signal.

A leading edge time delay circuit 27 delays the high signal from the comparator 25 by approximately 5 milliseconds. The rising leading edge of the delayed high signal is then used to set a flip flop 29 to develop a DOCUMENT PRESENT signal to commence a line scanning operation (to be explained) on the document 15 as it moves past the scan position 23.

The rising leading edge of the DOCUMENT PRESENT signal was generated by the leading edge of the document 15. However, the DOCUMENT PRESENT signal is not initiated until approximately 5 milliseconds after the document 15 is detected in order to compensate for a 12 millimeter physical displacement of the sensor 21 from the scan position 23.

As the trailing edge of the document 15 passes between the LED 19 and sensor 21, the light path between the LED 19 and sensor 21 is restored. This causes the sensor signal from sensor 21 to fall. As a result, the comparator 25 outputs a low signal which is delayed by a trailing edge time delay 31 for approximately 5 milliseconds to again compensate for the 12 millimeter displacement of the sensor 21 from the scan position 23.

The time delay 31 also inverts the falling trailing edge of the signal from the comparator 25 to develop a rising signal to reset the flip flop 29. This resetting of the flip flop 29 terminates the DOCUMENT PRESENT signal, thereby terminating the line scanning operation on the document 15 since the trailing edge of the document 15 has moved past the scan position 23 at this time.

A line scanning operation is performed on the document 15 as the document 15 passes the scan position 23. As the document 15 is moved along the path 17, it is illuminated at the scan position 23 by light from a light source or lamp 23 passing through a light guide 35. A reflected optical image of characters printed on the document 15 is focused by a lens assembly 37 onto the face of an imaging sensor array 39. The array 39 could comprise any suitable array such as, for example, an array of photodiodes, a photoarray or a charge coupled device array.

For purposes of this description, the array 39 is an electrically-scanned, 64 element, linear photodiode array sold by the Reticon Corporation, Sunnyvale, Calif. and designated as a model RL-64A Solid State Linear Scanner. The array 39 is positioned adjacent to the scan position 23 and is physically oriented perpendicular to the path 17 of the document 15. The array 39 covers a total scan band of approximately 11 millimeters (0.4 inches) in 64 segments of approximately 0.16 millimeters (0.00625 inches) each.

During a line scanning operation a timing and control circuit 41 is enabled by the DOCUMENT PRESENT signal to selectively generate two-phase clocks, designated as PHASE 1 and PHASE 2, a START ARRAY SIGNAL, CLK clocks and SHIFT pulses.

The array 39 is clocked by the PHASE 1 and PHASE 2 clocks at a combined nominal rate of 1.111 MHz (megahertz) for scanning the photodiodes (not shown) in the array 39 from bottom to top. Thus, as the document 15 traverses the scan position 23 of the array 39, the array 39 generates a plurality of vertical scan lines of the 0.4 inch scan band of the document 15. Each scan line of the array 39 develops a serial sequence of 64 discrete analog picture elements or pixel signals related in exact sequence to the respective positions of the photodiodes in the array 39. Considering the relatively high frequency at which the photodiodes in the array 39 are scanned, each sequence of 64 pixels in a scan represents a substantially unskewed slice of the scan band. The START ARRAY signal from the timing and control circuit 41 starts a new scan line approximately two microseconds after the preceding scan line is terminated. As a result, each of the 0.16 millimeter high columns lies substantially adjacent to each other along the length of the scan band.

The amplitude of each pulse from each photodiode in the array 39 is substantially proportional to the arithmetic product of the light falling on the corresponding photodiode and the time the photodiode is exposed to the light. The 64 pulses in each scan line from the array 39 are converted to raw video pulses in video amplifier 43. The raw video pulses from the video amplifier 43 consist of 64 negative-going pulses, having amplitudes between −1.4 V (volts) for black pixel data and −5 V for white pixel data. All 64 raw video pulses represent one vertical scan of the 0.4 inch scan band of the document 15. This scan band is adjustably positioned to where the OCR print is located on the document 15.

The pulses from video amplifier 43 are applied to a unity voltage gain, current amplifier 45 to develop analog VIDEO PULSES. These analog VIDEO PULSES, which represent discrete pixel signals from the array 39, are applied to a low pass filter 47 and a 3-bit analog-to-digital (A/D) converter 49.

In response to the VIDEO PULSES, the low pass filter 47 generates a bias level that is the lowest voltage level of the VIDEO PULSES encountered in the document 15 being scanned. This lowest voltage level represents the white background level of that document 15. The lowest voltage level signal from the filter 47 is applied to an adjustable or variable gain amplifier 51 in order to provide an adjustable LOWEST REFERENCE LEVEL to the analog-to-digital converter 49. This LOWEST REFERENCE LEVEL from the amplifier 51 is utilized by the converter 49 to internally establish 8 levels of quantization.

The converter 49 is enabled by the DOCUMENT PRESENT signal to synchronously digitize each of the VIDEO PULSES at the CLK rate into a 3-bit digital signal representing an associated one of the 8 levels of quantization. This 3-bit digital signal is a 0 (000) for a white or background pixel, a 7 (111) for a very dark or black pixel, and some quantity from 1 (001) through 6 (110) for any one of the six shades of gray pixels between 0 and 7.

Streams of 3-bit digital signals developed by the converter 49 from consecutive line scans of the document 15 are clocked into a pixel data selector 53 by SHIFT pulses. The pixel data selector 53 operates to apply each 3-bit pixel signal as a center pixel signal, as well as selected 3-bit neighboring pixel signals of that center pixel signal, to an enhancement circuit 55 which is also clocked by SHIFT pulses. The enhancement circuit 55 looks at each center pixel signal and its selected neighboring pixel signals and determines as a function of a predetermined enhancement algorithm whether or not the center pixel signal should be outputted as black or white pixel data. The cumulative effect of this enhancement algorithm is to thicken thin character segments and thin thick character segments.

Figure 2:
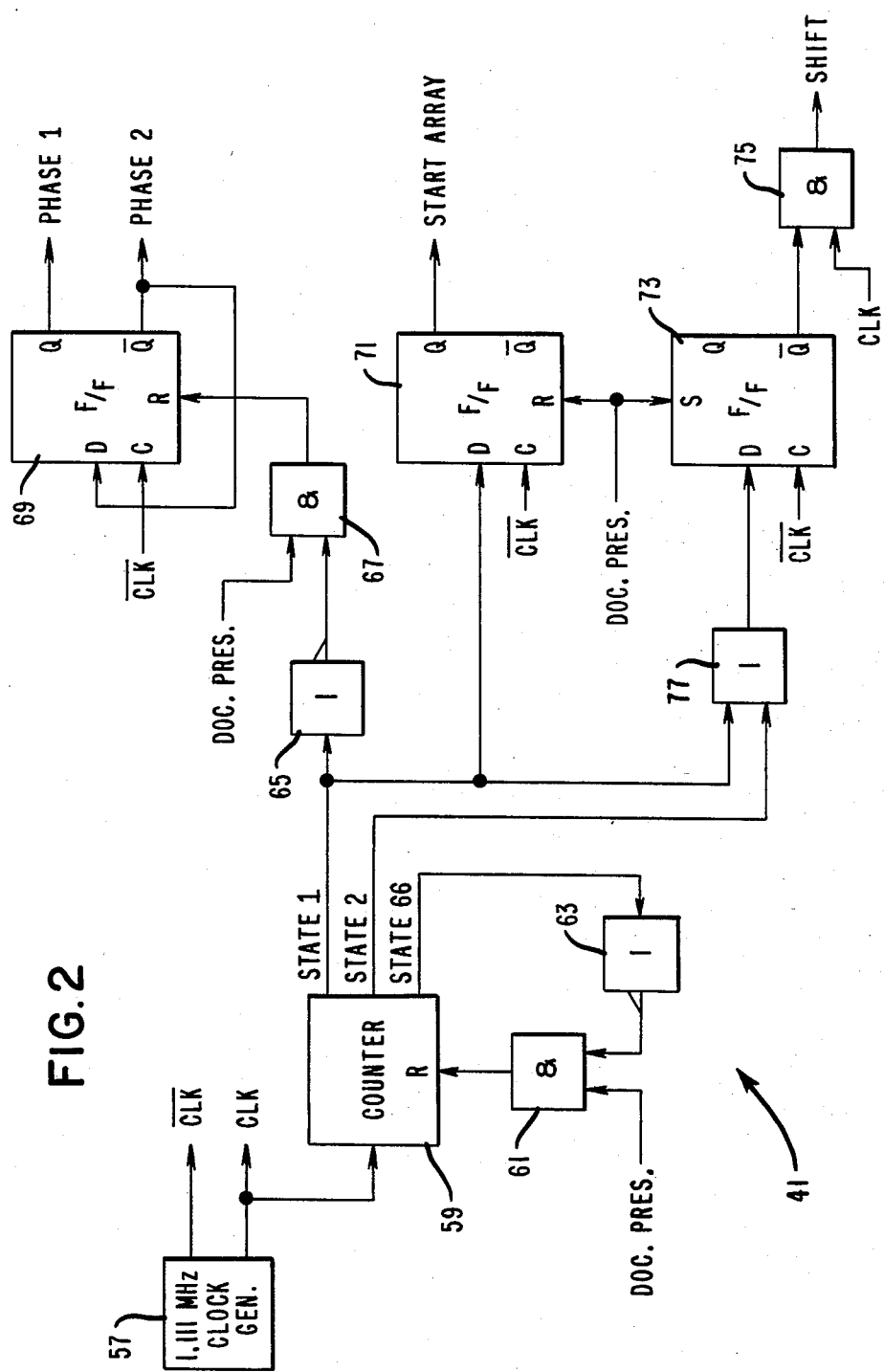
FIG. 2 is a schematic block diagram of the timing and control circuit of FIG. 1.
Figure 3:
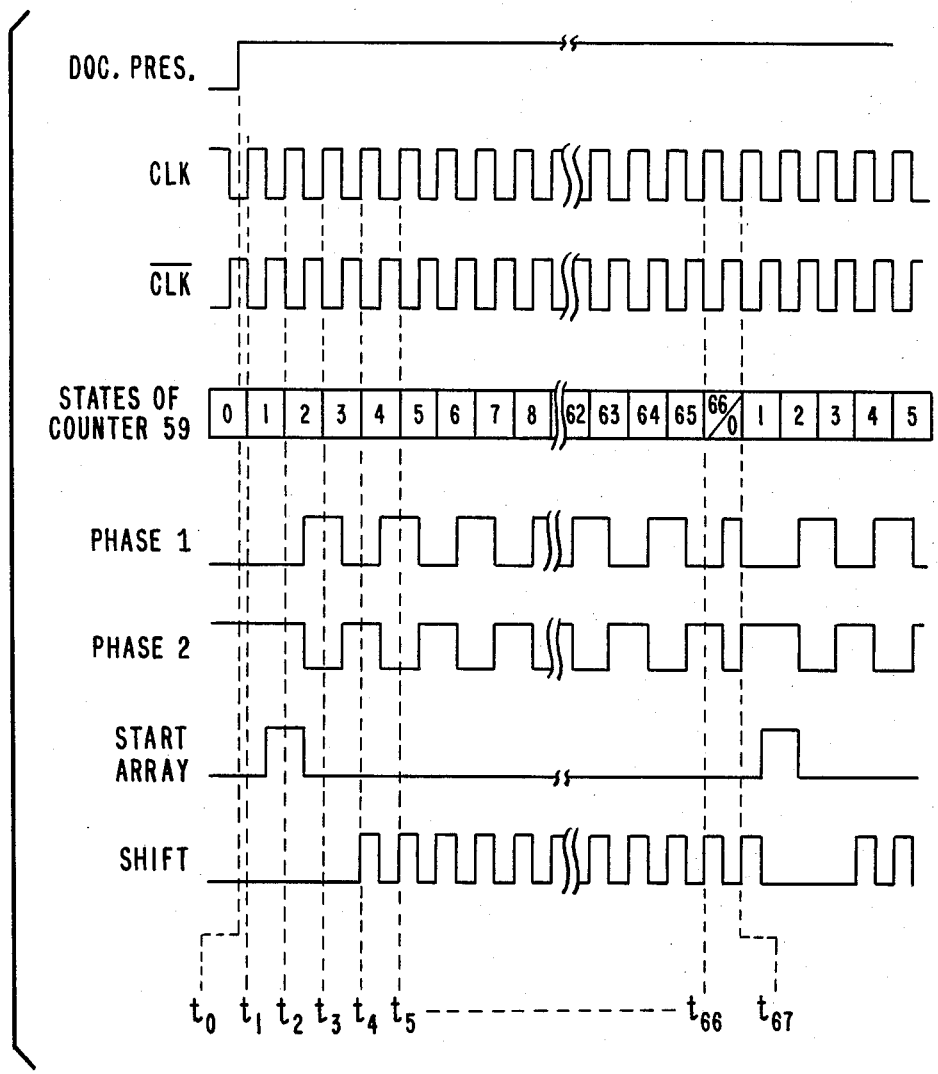
FIG. 3 illustrates waveforms useful in explaining the operation of the timing and control circuit of FIG. 1.

The timing and control circuit 41 will now be explained by referring to the circuit 41 shown in FIG. 2 and its waveforms shown in FIG. 3.

A 1.111 MHz clock generator 57 develops two-phase clocks, CLK and CLK/. Clock CLK is applied to the count input of a counter 59. When no document 15 (FIG. 1) is present in the path 17 (FIG. 1), the DOCUMENT PRESENT signal is low. The DOCUMENT PRESENT signal is applied to a first input of an AND gate 61. This low DOCUMENT PRESENT signal causes AND gate 61 to output a low signal to hold the counter 59 reset to a high STATE 0 (not shown). As a result, the counter 59 outputs low STATE 1, STATE 2 and STATE 66 signals at this time.

The low STATE 66 signal from counter 59 is inverted by inverter 63 to enable a second input of AND gate 61. However, since DOCUMENT PRESENT is low at this time, the resultant low signal from AND gate 61 keeps the counter 59 reset to its high STATE 0.

The low STATE 1 signal from counter 59 is inverted by an inverter 65 to enable a first input of an AND gate 67. However, since DOCUMENT PRESENT is low at this time, the resultant low signal from AND gate 67 holds a flip-flop 69 reset. When held in a reset condition, the flip-flop 69 is prevented from generating PHASE 1 and PHASE 2 clocks at its Q and Q/ outputs, respectively.

The low DOCUMENT PRESENT signal also holds a flip-flop 71 reset and a flip-flop 73 set. While being held reset, the flip-flop 71 is prevented from developing a START ARRAY pulse at its Q output. Similarly, while being held set, the resultant low Q/ output of flip-flop 73 disables an AND gate 75. When disabled the AND gate 73 prevents CLK pulses from passing therethrough as SHIFT pulses.

At time $t_0$ DOCUMENT PRESENT goes high, indicating that a document 15 (FIG. 1) has been detected. The high DOCUMENT PRESENT signal enables AND gate 67, removes the reset from flip-flop 71 and removes the set from flip-flop 73. In addition, the high DOCUMENT PRESENT signal is passed through enabled AND gate 61 to remove the reset from the counter 59 and enable the counter 59 to start counting CLK pulses.

At time $t_1$, the rising edge of the first CLK pulse after time $t_0$ causes the counter 59 to output a high STATE 1 signal. This high STATE 1 signal is inverted by inverter 65. Even though AND gate 67 is now enabled by the high DOCUMENT PRESENT signal, the low output of inverter 65 causes AND gate 67 to output a low signal to hold flip-flop 69 reset during the period of STATE 1 ($t_1$-$t_2$). The high STATE 1 signal is also applied to the data input of flip-flop 71 and also through OR gate 77 to the data input of flip-flop 73.

The rising edge of the first CLK/ pulse after $t_1$ clocks the high STATE 1 signal out of the flip-flop 71 as the START ARRAY signal to start a new line scan in the array 39 (FIG. 1). The rising edge of the first CLK/ pulse after $t_1$ also clocks the high STATE 1 signal to the Q output of flip-flop 73, causing the low Q/ output of flip-flop 73 to disable AND gate 75 to prevent the AND gate 75 from outputting a SHIFT pulse during the period ($t_1$-$t_2$) of STATE 1.

At time $t_2$ the rising edge of a CLK pulse causes the counter 59 to output a high STATE 2 signal. The STATE 1 signal goes low and remains low after time $t_2$. The low STATE 1 signal is applied to the data input of flip-flop 71 and is also inverted by inverter 65 and passed through enabled AND gate 67 to remove the reset from flip-flop 69.

The rising edge of the first CLK/ pulse after $t_2$ clocks the low STATE 1 signal out of flip-flop 71 to terminate the START ARRAY pulse.

Note that the Q/ output of flip flop 69 is connected to the data input of flip-flop 69 to determine the next output of that flip-flop. Since the reset was removed from the flip flop 69 at time $t_2$, the flip-flop 69 will develop a sequence of PHASE 1 and PHASE 2 clock outputs on the rising edges of the subsequent CLK/ pulses. Each of the PHASE 1 and PHASE 2 clocks will have a nominal frequency of 0.555 MHz. The 64 rising transitions of the PHASE 1 and PHASE 2 clocks between times $t_2$ and $t_{66}$ are used to scan the array 39 (FIG. 1) to develop a line scan of pixel data. The pulse developed between time $t_{66}$ and time $t_{67}$ can be used to initialize or reset the array 39 for the next line scan operation which, as shown in FIG. 3, begins at time $t_{67}$.

The high STATE 2 signal is also applied through OR gate 77 to the data input of flip-flop 73. The rising edge of the first CLK/ pulse after $t_2$ clocks the high STATE 2 signal to the Q output of flip flop 73, causing the low Q/ output of flip-flop 73 to disable the AND gate 75 to prevent the AND gate 75 from outputting a SHIFT pulse during the period ($t_2$-$t_3$) of STATE 2.

At time $t_3$ the counter 59 changes to a high STATE 3 signal (not shown). At this time both of the STATE 1 and STATE 2 signals are low. As a result, the OR gate 77 applies a low signal to the data input of flip-flop 73. The rising edge of the first CLK/ pulse after time $t_3$ clocks this low signal from OR gate 77 to the Q output of flip flop 73. The resultant high Q/ output of flip flop 73 then enables AND gate 75 to pass 64 successive CLK pulses out as 64 SHIFT pulses during the remaining portion of a line scan period. The first two CLK pulses which occur during the line scan period are prevented from passing through AND gate 75 as SHIFT pulses by the consecutive high STATE 1 and STATE 2 signals from the counter 59.

At time $t_{66}$, the counter 59 changes to a high STATE 66 signal. However, the leading rising edge of this high STATE 66 signal is inverted by inverter 63 to a falling edge and passed through AND gate 61 to immediately reset the counter 59 to a high STATE 0. This causes the STATE 66 output to go low.

The counter 59 remains in this high STATE 0 condition until time $t_{67}$. At time $t_{67}$, the rising edge of the next CLK pulse after time $t_{66}$ causes the counter 59 to start outputting a new sequence of STATE 1 through STATE 66/0 signals for the next line scan. Note that the AND gate 75 is still enabled by a high Q/ output from flip-flop 75 to output SHIFT pulses until the first rising edge of CLK/ after $t_{67}$ clocks the flip-flop 73 to disable the AND gate 75. The operation of each succeeding scan is similar to that described above. When the document 15 (FIG. 1) has been completely scanned, DOCUMENT PRESENT goes low to terminate the above-described scanning operation until another document 15 is to be scanned.

Figure 4:
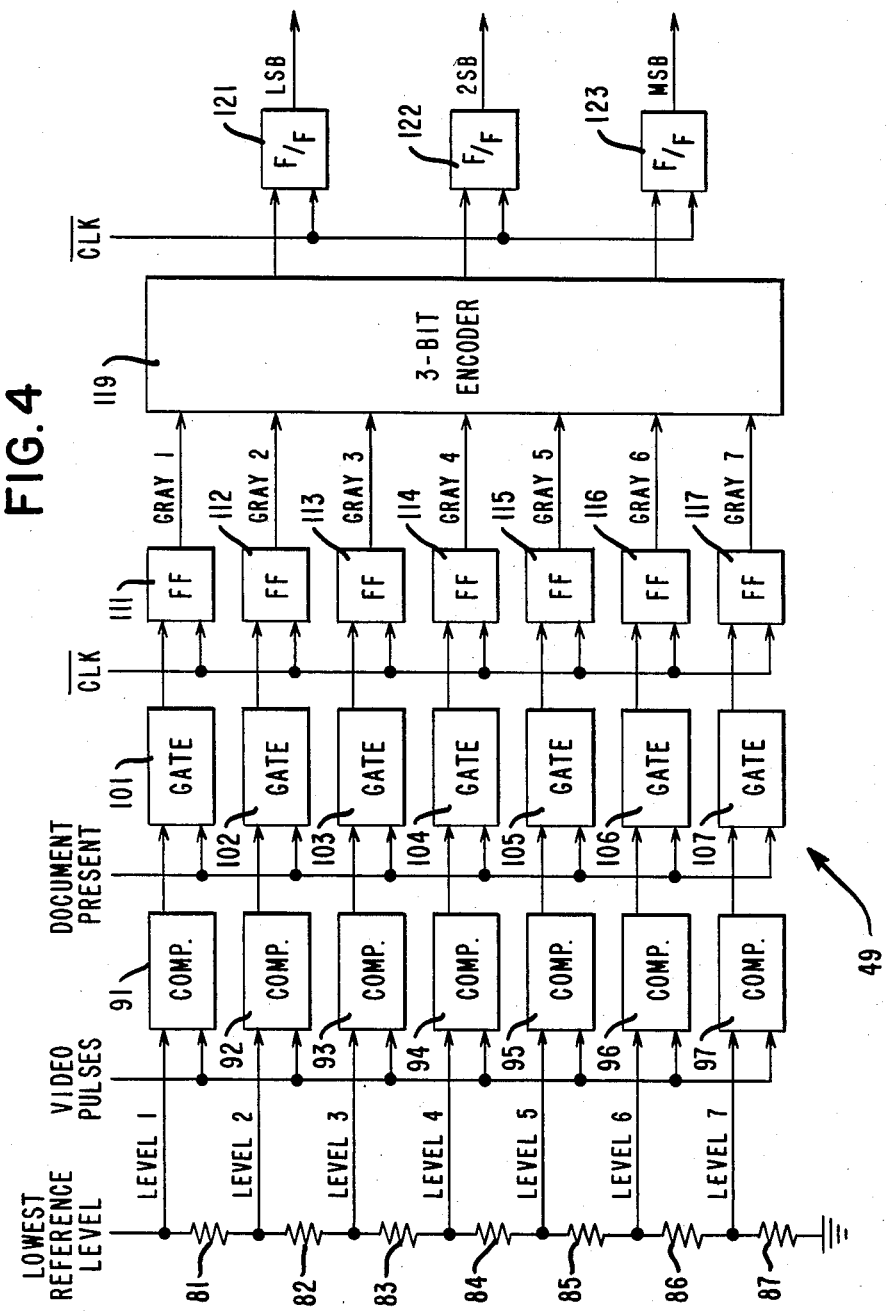
FIG. 4 is a schematic block diagram of the 3-bit analog-to-digital converter of FIG. 1.

FIG. 4 illustrates the 3-bit analog-to-digital converter (A/D) 49 of FIG. 1. A resistor ladder comprised of serially-connected resistors 81-87 is connected between the LOWEST REFERENCE LEVEL and ground to establish voltage threshold levels 1-7. The LOWEST REFERENCE LEVEL (level 1) is set by the variable gain amplifier 51 of FIG. 1 to an exemplary voltage level of $-4.5$ V (volts) with background pixels at a $-5$ V level. As a result, exemplary values for levels 1-7 can be $-4.5$ V, $-4.05$ V, $-3.6$ V, $-3.15$ V, 2.7 V, $-2.25$ V. and $-1.8$ V, respectively.

Levels 1-7 are respectively applied to first inputs of comparators 91-97. Each of the sequence of video pulses from current amplifier 45 (FIG. 1) is applied in parallel to second inputs of the comparators 91-97 for comparison with levels 1-7. The amplitudes of these video pulses range from about $-5$ V for a white pixel to about $-1.4$ V for a black pixel.

If the amplitude of an input video pulse crosses or goes below the threshold level applied to a comparator, that comparator will output a low or 0 state signal while the video pulse is below that level. Conversely, if the amplitude of an input video pulse does not cross or go below the threshold level applied to a comparator, that comparator will output a high or 1 state signal. It can therefore be seen that the output from each of the comparators 91-97 is binary in format and quantized on the basis of an associated one of the threshold levels 1-7 applied to that comparator.

The 0 and/or 1 state binary outputs of comparators 91-97 are respectively applied to first inputs of gates 101-107. The DOCUMENT PRESENT signal is applied in parallel to second inputs of gates 101-107. When no DOCUMENT PRESENT SIGNAL is applied, the gates 101-107 inhibit the passage of the digitized video pixel data from the comparators 91-97. When DOCUMENT PRESENT is high, indicating that a document 15 (FIG. 1) is being scanned, the gates 101-107 are enabled to respectively pass the pixel data from the comparators 91-97 to set inputs of flip-flops 111-117.

At the beginning of each one of the input video pulses, all of the flip-flops 111-117 are reset to low or 0 state outputs by the falling edge of CLK/. After one of the flip-flops 111-117 is reset to a 0 state output by CLK/, the following binary state of its associated comparator will determine whether or not that flip-flop will be set. A binary 0 from its associated comparator will set the flip-flop to develop a high or 1 state output, whereas a binary 1 from its associated comparator will cause the flip-flop to remain in its reset condition to develop a low or 0 state output.

The outputs of flip-flops 111-117 are designated as GRAY 1-GRAY 7 and are indicative of the relative amplitude of the video pulse occurring after the falling edge of CLK/. These GRAY 1-GRAY 7 signals are converted into a 3-bit digital code or signal by a 3-bit encoder 119. The three bits of the code at the output of encoder 119 are respectively latched into flip-flops 121-123 by the rising edge of the CLK/ pulse in order to respectively develop LSB (least significant bit), 2SB (second significant bit) and MSB (most significant bit) outputs.

The following TABLE 1 illustrates the various possible values of the GRAY 1-GRAY 7 signal inputs to encoder 119 and the resultant, associated LSB, 2SB and MSB outputs from encoder 119.

TABLE 1

| INPUTS TO ENCODER 119 GRAY OUTPUTS | | | | | | | OUTPUTS OF ENCODER 119 | | |
|---|---|---|---|---|---|---|---|---|---|
| 1 | 2 | 3 | 4 | 5 | 6 | 7 | LSB | 2 SB | MSB |
| 1 | 1 | 1 | 1 | 1 | 1 | 1 | 0 | 0 | 0 |
| 0 | 1 | 1 | 1 | 1 | 1 | 1 | 0 | 0 | 1 |
| 0 | 0 | 1 | 1 | 1 | 1 | 1 | 0 | 1 | 0 |
| 0 | 0 | 0 | 1 | 1 | 1 | 1 | 0 | 1 | 1 |
| 0 | 0 | 0 | 0 | 1 | 1 | 1 | 1 | 0 | 0 |
| 0 | 0 | 0 | 0 | 0 | 1 | 1 | 1 | 0 | 1 |
| 0 | 0 | 0 | 0 | 0 | 0 | 1 | 1 | 1 | 0 |
| 0 | 0 | 0 | 0 | 0 | 0 | 0 | 1 | 1 | 1 |

In the operation of the 3-bit A/D converter 49 of FIG. 4, a white level pixel signal or video pulse with an amplitude of, for example, $-5$ V will cross each of the levels 1-7 and cause all of the comparators 91-97 to output binary 0 signals. These seven binary 0 signals will set all of the flip-flops 111-117 to output 1-state GRAY 1-GRAY 7 signals. As shown in TABLE 1, the encoder 119 will interpret these seven 1-state signals (1111111) as a digital 3-bit code 000, indicating a white level video pulse. On the other hand, a black level video pulse with an amplitude of, for example, $-1.4$ V will not cross any of the levels 1-7 and, therefore, all of the comparators 91-97 will output binary 1 signals. These seven 1 state signals will not set any of the flip-flops 111-117. Therefore, the flip-flops 111-117 will remain in their reset conditions, outputting 0-state GRAY 1–GRAY 7 signals. As shown in TABLE 1, the encoder 119 will interpret these seven 0-state signals (0000000) as a digital 3-bit code 111, indicating a black level video pulse. A gray level video pulse, having an amplitude between 000 (white) and 111 (black), will cross some, but not all, of the levels 1–7. For example, if a video pulse is −2.9 V in amplitude, it will cross levels 5–7 but not levels 1–4. As a result, this −2.9 V video pulse will cause the outputs of flip-flops 115–117 to be set high, with flip-flops 111–114 remaining reset to low outputs. The encoder 119 will interpret the resultant GRAY 1–GRAY 7 signals (0000111) as a digital 3-bit code 4 (100), as shown in TABLE 1. Note in TABLE 1 that there are eight different combinations of GRAY 1–GRAY 7 signals that can be inputted to the encoder 119, since a video pulse can cross none or any number of the levels 1–7.

With each line scan of the document 15, 64 video or pixel data pulses are applied to the A/D converter 49. As mentioned before, the converter 49 quantizes each of the video pulses into eight discrete levels represented by the LSB, 2SB and MSB binary signals. Consequently, each of the LSB, 2SB and MSB outputs of the A/D converter 49 is comprised of a serial binary data bit stream. These three serial binary data bit streams, which collectively form a 3-bit wide sequence of quantized video pulse values, are applied in parallel to the pixel data selector 53 illustrated in FIG. 5.

Basically, pixel data selector 53 formats the three data bit streams in order to selectively apply each 3-bit pixel signal and predetermined neighboring 3-bit pixel signals of that 3-bit pixel signal to the enhancement circuit 55 for subsequent enhancement of the data derived from the scanned document 15.

Figure 5:
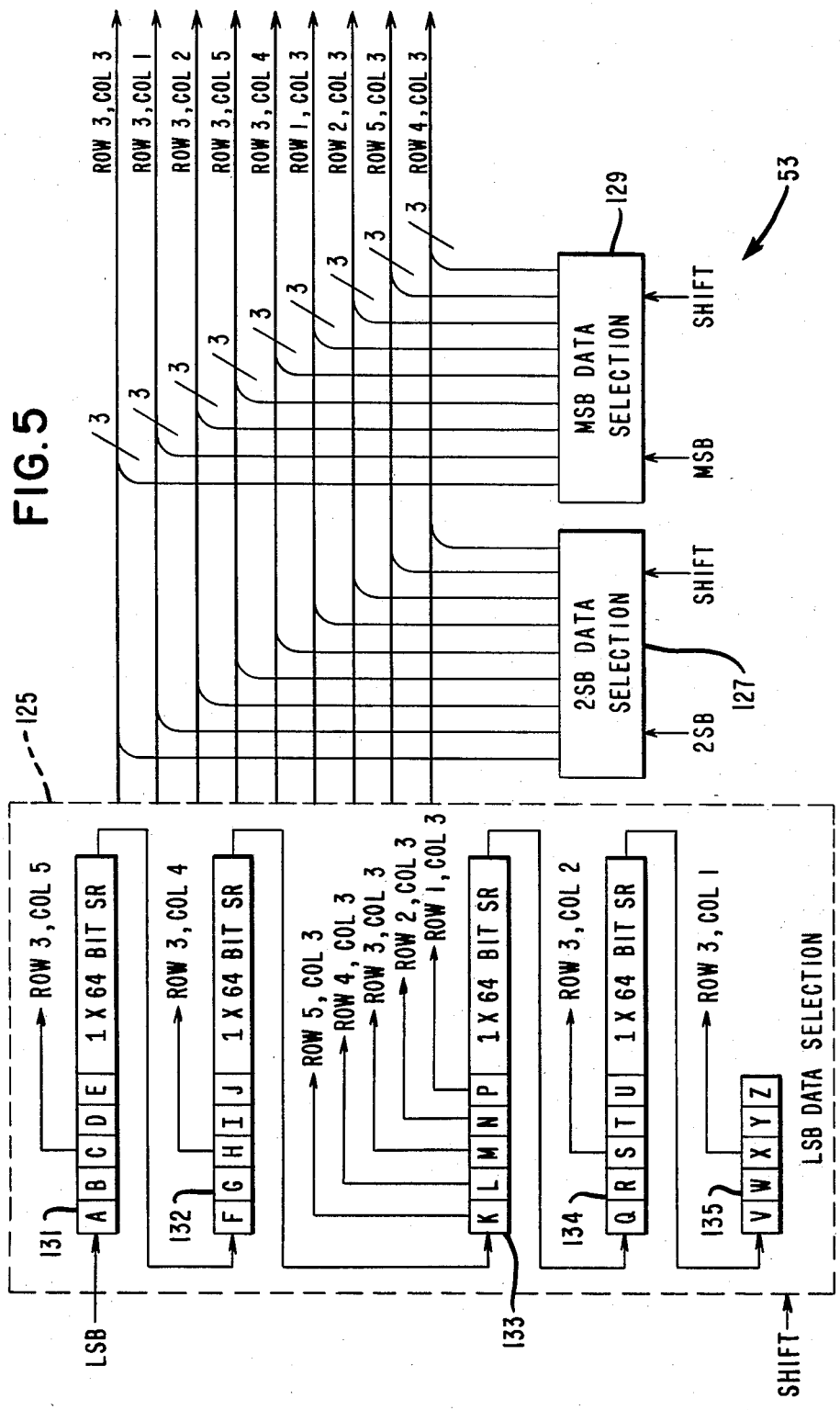
FIG. 5 is a schematic block diagram of the pixel data selector of FIG. 1.

As shown in FIG. 5, the LSB serial binary data bit stream is applied to an LSB data selection circuit 125, while the 2SB and MSB serial binary data bit streams are respectively applied to 2SB and MSB data selection circuits 127 and 129. Since the data selection circuits 125, 127 and 129 are similar in structure and operation, only the LSB data selection circuit 125 will be discussed in detail.

The LSB serial binary data bit stream, comprised of the LSB data derived from consecutive scans of the document 15, is synchronously shifted through serially connected 1 by 64-bit shift registers 131–134 and 5-bit shift register 135 by the SHIFT pulses. Since, as stated before, the document 15 (FIG. 1) is being vertically scanned by the array 39 (FIG. 1), the shift registers 131–134 store complete columns of data while the shift register 135 stores a partial column of data. More specifically, the LSB data stored in shift register 135 represents the LSB data from the last five video pulses of a first column, while the LSB data stored in shift registers 134, 133, 132 and 131 represents the LSB data of second, third, fourth and fifth columns, respectively. In this manner, a 5-bit-by-5 bit window or matrix of LSB data is formed comprised of the first five stages of shift registers 131–135. More particularly, the 5 by 5 bit matrix is comprised of column 5 stages A–E of register 131, column 4 stages F–J of register 132, column 3 stages K–N and P of register 133, column 2 stages Q–U of register 134 and column 1 stages V–Z of register 135.

The center LSB of this 5 bit-by-5 bit matrix is taken from the output of stage M and is outputted from the LSB data selection circuit 125 as the row 3, column 3 LSB signal. For purposes of subsequent enhancement, not all of the LSB signals in the matrix are needed. As a result, just the center LSB, the two LSBs to the left of the center LSB, the two LSBs to the right of the center LSB, the two LSBs above the center LSB and the two LSBs below the center LSB are selected from the matrix in the LSB data selection circuit 125 for further processing.

The output of stage S in register 134 and the output of stage X in register 135 are the two LSB signals to the right of the center LSB and are outputted as the row 3, column 2 and row 3, column 1 LSB signals, respectively. The output of stage H in register 132 and the output of stage C in register 131 are the two LSB signals to the left of the center LSB and are outputted as the row 3, column 4 and row 3, column 5 LSB signals, respectively. Similarly, the outputs of stages N and P in register 133 are the two LSB signals below the center LSB and are outputted as the row 2, column 3 and row 1, column 3 LSB signals, respectively. Finally, the outputs of stages L and M in register 133 are the two LSB signals above the center LSB and are outputted as the row 4, column 3 and row 5, column 3 LSB signals, respectively.

Each of the 2SB and MSB data selection circuits 127 and 129 output binary data from locations in shift registers (not shown) similar to the previously specified locations in shift registers 131–135 of LSB data selection circuit 125, but for respective 2SB and MSB binary signals. As shown in FIG. 5, correspondingly positioned LSB, 2SB and MSB bits from the data selection circuits 125, 127 and 129 are combined to simultaneously form a group of nine 3-bit wide pixel signals from columns 1–5 of row 3 and rows 1, 2, 4 and 5 of column 3. This group of 3-bit wide pixel signals is then applied in parallel to the enhancement circuit 55 of FIG. 6. Each subsequent SHIFT pulse causes a new group of nine 3-bit wide pixel signals to be applied to the enhancement circuit 55.

The enhancement circuit 55 looks at each 3-bit center pixel signal and its selected, associated, neighboring 3-bit pixel signals and determines as a function of a predetermined enhancement algorithm whether or not the center pixel signal should be outputted as black or white pixel data.

The enhancement circuit 55 stores the enhancement algorithm in data comparison PROMs 141–144, axis decision PROMs 145 and 146, and B/W (black/white) decision PROM 147. This enhancement algorithm operates on the 3-bit wide pixel data from columns 1–5 of row 3 and from rows 1, 2, 4 and 5 of column 3 to determine a black or white decision in relation to the 3-bit wide center pixel signal from column 3, row 3 during the period of each SHIFT pulse.

The enhancement algorithm operates on the constant strokewidth features of the OCR fonts. Strokewidth for size I OCRA, OCRB, 1428 and 1403 fonts are all nominally 0.014 inches wide. With an optics resolution of 6.25 mils by 5.94 mils per pixel, a scan of an OCR character should produce an image with strokewidths of 2 or 3 pixels wide. When scanning a character this enhancement algorithm simply turns black the 2 or 3 pixels (of a character segment) which have the highest digital level and turns all other pixels white.

Figure 6:
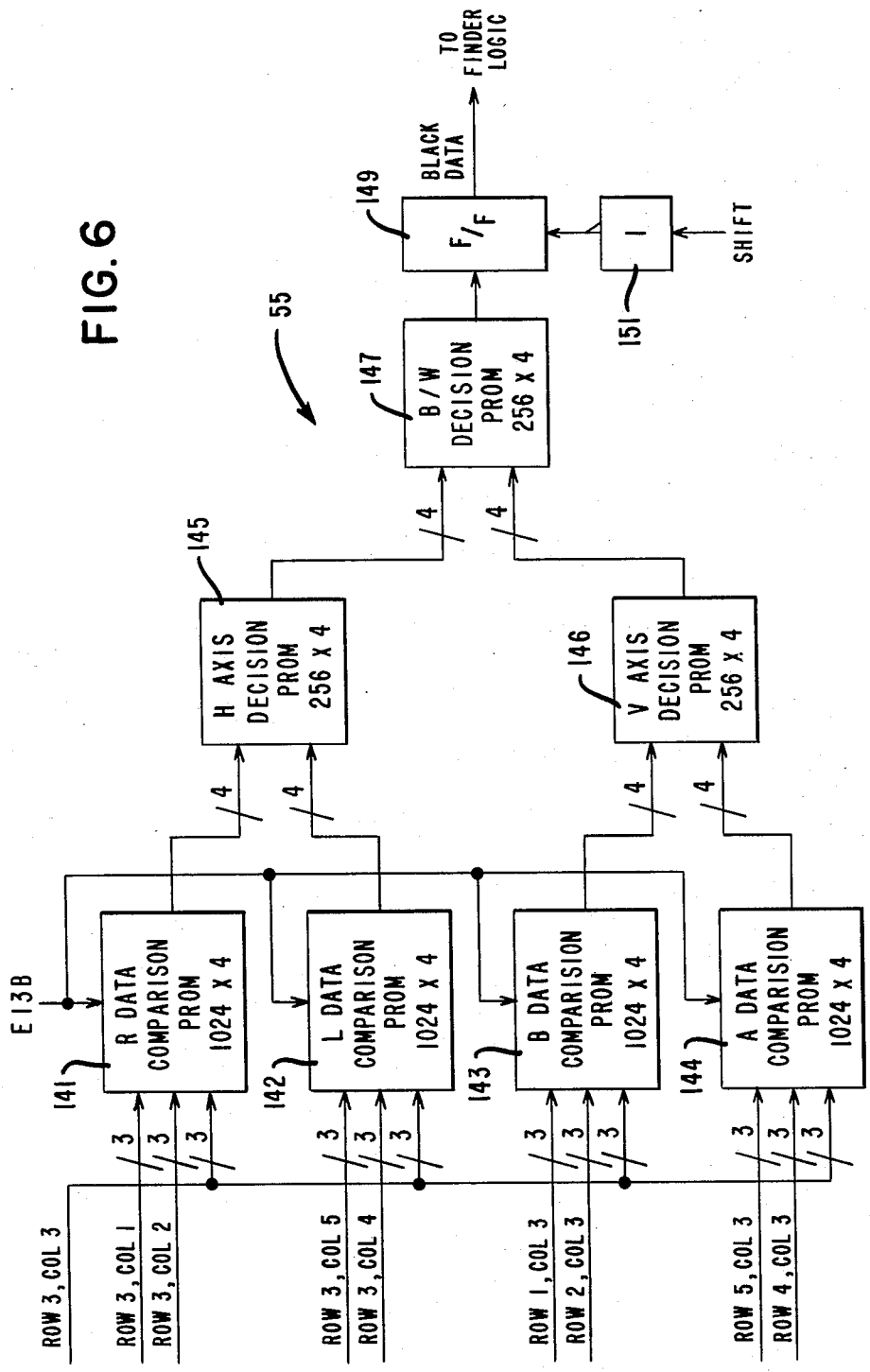
FIG. 6 is a schematic block diagram of the enhancement circuit of FIG. 1.

As shown in FIG. 6, the 3-bit wide pixel signals from columns 1–5 of row 3 and from rows 1, 2, 4 and 5 of column 3 are selectively applied to the data comparison PROMs 141–144. Each of these PROMs is similar to the others and stores the same data comparison algorithm in 1024 four-bit wide memory locations. As a result of this commonly stored data comparison algorithm, the designations shown in FIG. 7 will be used in the explanation of the data comparison algorithm. It is the center pixel signal C upon which a decision is to be made. This center pixel C from row 3, column 3 is applied to each of the PROMs 141–144. Note that the pixel signals that are located one and two pixel positions away from the center pixel C along either a horizontal or vertical axis are respectively designated as Ax and Ay.

Figures 7, 8A, 8B, 8C, 8D:
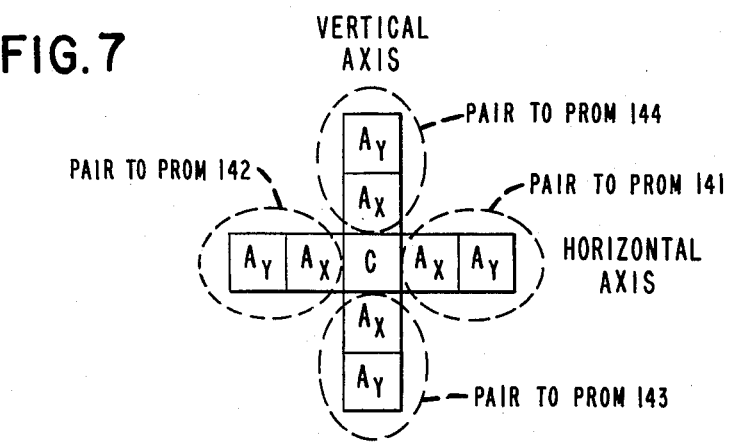

Each of the PROMs 141–144 compares the center pixel C with the two pixels Ax and Ay beside it on one side, as shown in FIGS. 5–7. The PROM 141 compares the center pixel signal C from row 3, column 3 with the two pixel signals to the right (R) of C, which are applied from row 3, columns 2 and 1, respectively. The PROM 142 compares C with the two pixel signals to the left (L) of C, which are applied from row 3, columns 4 and 5, respectively. The PROM 143 compares C with the two pixel signals below (B) C, which are applied from column 3, rows 2 and 1, respectively. Finally, the PROM 144 compares C with the two pixel signals above (A) C, which are applied from column 3, rows 4 and 5, respectively.

Also applied to each of the PROMs 141–144 is an E13B line. When OCR fonts are being optically scanned in FIG. 1, the E13B line is in a low or 0 state. When an E13B font is being optically scanned, the E13B line is in a high or 1 state.

To perform the above stated comparison of C with the associated two Ax and Ay pixel signals beside C on a given side, each of the PROMs 141–144 uses the binary state of the E13B line, the 3-bit C signal and the 3-bit associated Ax and Ay signals as a 10-bit address. In response to its associated 10-bit address, each of the PROMs 141–144 will output a 4-bit hexadecimal code representing 1 of 10 possible conditions. TABLE 2 illustrates the OCR data comparison algorithm that is contained in each of the PROMs 141–144. TABLE 2 shows 10 output PROM codes, the 10 possible conditions that produce those 10 codes, when the 10 conditions occur and an explanation of the conditions.

FIGS. 8A–8K illustrate the various conditions of TABLE 2 that can be found in the preselected C, Ax and Ay locations shown in FIG. 7.

In addition to TABLE 2, TABLE 2A shows a comprehensive list of various E13B, C, Ax and Ay inputs which form hexadecimal addresses to produce associated PROM code outputs for the data comparison PROMs 141–144 during an OCR reading operation.

TABLE 2

OCR DATA COMPARISON ALGORITHM

| PROM CODE | CONDITION | PRIORITY OF TEST | WHEN | EXPLANATION |
|---|---|---|---|---|
| 0 | W (White) | 2 | $C=0$ | Background Pixel |
|   |   | 9 | $C \leq Ax$ and $C \leq (Ay-3)$ | Large transition from dark |
|   |   | 10 | $C \leq (Ax-3)$ and $C \leq (Ay-2)$ | to light will turn pixels white. |
| 1 | ES (End of Segment) | 11 | $Ax=0$ | Flags a possible End of Segment to prevent stretching of Segments. |
| 2 | S (Segment) | 12 | $[(Ay-2)<C<Ax]$ and $[Ax>Ay]$ | Used to turn the 2 or 3 highest level pixels of a character segment black. |
| 3 | HS (Half Segment) | 13 | $C>Ax$ | Also used to turn the 2 or 3 |
|   |   | 14 | $C=Ax$ and $C>Ay$ | highest level pixels of a character segment black, but requires a Half Segment to be detected on other side of same axis. |
| 4 | RB (Remove if Border) | 18 | $C=(Ax-2)$ and $C=(Ay-2)$ | Pixel is detected as not being |
|   |   | 19 | $C \geq$ each of $(Ax-1)$ and $(Ay-2)$ and $\leq$ each of $Ax$ and $(Ay-1)$ | on a Segment, and may be turned white if other sides do not override. |
| 5 | PC (Possible Corner) | 20 | $C \geq 2$ and $C=$ each of $Ax$ and $Ay$ | Used to prevent the turning white of pixels at the corners of the intersection of 2 character segments. |
| 6 | PC, RB (Possible Corner and Remove if Border) | 15 | $C \geq 2$ and $C=$ each of $Ax$ and $(Ay-1)$ | Both conditions of a Possible Corner and a Remove if Border exist. |
|   |   | 16 | $C \geq 2$ and $C=$ each of $(Ax-1)$ and $(Ay-1)$ |   |
| 8 | ND (No Decision) | 17 | $C=1$ and $Ax=1$ $Ay=1$ | Decision on this pixel is up to the opposite Axis. |
| A | TDS (Thin Dark Segment) | 4 | $(1 \leq C \leq 3)$ and $(Ax=6)$ and $(C \geq (Ay-1))$ | This condition will turn the highest 2 or 3 pixels of a segment black and cannot be overridden by a white decision on the opposite axis. |
|   |   | 5 | $(C=4)$ and $(Ax=6)$ and $(0 \leq Ay \leq 4)$ |   |
|   |   | 6 | $(1 \leq C \leq 2)$ and $(Ax=5)$ and $(C \geq (Ay-1))$ |   |
|   |   | 7 | $(C=3)$ and $(Ax=5)$ and $(0 \leq Ay \leq 3)$ |   |
|   |   | 8 | $(C=4)$ and $(Ax=5)$ and $(0 \leq Ay \leq 2)$ |   |
| F | B (Black) | 1 | $C=7$ | Pixel is turned Black since |
|   |   | 3 | $((Ay-1) \leq C < Ax)$ and $(Ax=7)$ | the pixel, or a pixel in the Segment, exceeds the highest threshold. |

Note:
Priority is shown in TABLE 2 since the data patterns can meet several of the conditions at the same time.

TABLE 2A

DATA COMPARISON PROM OPERATION (OCR)

| E13B SIG. | C/Ax/Ay DATA IN | ADDR (HEX) | PROM CODE | E13B SIG. | C/Ax/Ay DATA IN | ADDR (HEX) | PROM CODE |
|---|---|---|---|---|---|---|---|
| 0 | 000 | 000 | 0 | 0 | 040 | 020 | 0 |
| 0 | 001 | 001 | 0 | 0 | 041 | 021 | 0 |
| 0 | 002 | 002 | 0 | 0 | 042 | 022 | 0 |
| 0 | 003 | 003 | 0 | 0 | 043 | 023 | 0 |
| 0 | 004 | 004 | 0 | 0 | 044 | 024 | 0 |
| 0 | 005 | 005 | 0 | 0 | 045 | 025 | 0 |
| 0 | 006 | 006 | 0 | 0 | 046 | 026 | 0 |
| 0 | 007 | 007 | 0 | 0 | 047 | 027 | 0 |
| 0 | 010 | 008 | 0 | 0 | 050 | 028 | 0 |
| 0 | 011 | 009 | 0 | 0 | 051 | 029 | 0 |
| 0 | 012 | 00A | 0 | 0 | 052 | 02A | 0 |
| 0 | 013 | 00B | 0 | 0 | 053 | 02B | 0 |
| 0 | 014 | 00C | 0 | 0 | 054 | 02C | 0 |
| 0 | 015 | 00D | 0 | 0 | 055 | 02D | 0 |
| 0 | 016 | 00E | 0 | 0 | 056 | 02E | 0 |
| 0 | 017 | 00F | 0 | 0 | 057 | 02F | 0 |
| 0 | 020 | 010 | 0 | 0 | 060 | 030 | 0 |
| 0 | 021 | 011 | 0 | 0 | 061 | 031 | 0 |
| 0 | 022 | 012 | 0 | 0 | 062 | 032 | 0 |
| 0 | 023 | 013 | 0 | 0 | 063 | 033 | 0 |
| 0 | 024 | 014 | 0 | 0 | 064 | 034 | 0 |
| 0 | 025 | 015 | 0 | 0 | 065 | 035 | 0 |
| 0 | 026 | 016 | 0 | 0 | 066 | 036 | 0 |
| 0 | 027 | 017 | 0 | 0 | 067 | 037 | 0 |
| 0 | 030 | 018 | 0 | 0 | 070 | 038 | 0 |
| 0 | 031 | 019 | 0 | 0 | 071 | 039 | 0 |
| 0 | 032 | 01A | 0 | 0 | 072 | 03A | 0 |
| 0 | 033 | 01B | 0 | 0 | 073 | 03B | 0 |
| 0 | 034 | 01C | 0 | 0 | 074 | 03C | 0 |
| 0 | 035 | 01D | 0 | 0 | 075 | 03D | 0 |
| 0 | 036 | 01E | 0 | 0 | 076 | 03E | 0 |
| 0 | 037 | 01F | 0 | 0 | 077 | 03F | 0 |
| 0 | 100 | 040 | 1 | 0 | 140 | 060 | 2 |
| 0 | 101 | 041 | 1 | 0 | 141 | 061 | 2 |
| 0 | 102 | 042 | 1 | 0 | 142 | 062 | 2 |
| 0 | 103 | 043 | 1 | 0 | 143 | 063 | 0 |
| 0 | 104 | 044 | 1 | 0 | 144 | 064 | 0 |
| 0 | 105 | 045 | 1 | 0 | 145 | 065 | 0 |
| 0 | 106 | 046 | 1 | 0 | 146 | 066 | 0 |
| 0 | 107 | 047 | 1 | 0 | 147 | 067 | 0 |
| 0 | 110 | 048 | 3 | 0 | 150 | 068 | A |
| 0 | 111 | 049 | 8 | 0 | 151 | 069 | A |
| 0 | 112 | 04A | 4 | 0 | 152 | 06A | A |
| 0 | 113 | 04B | 4 | 0 | 153 | 06B | 0 |
| 0 | 114 | 04C | 0 | 0 | 154 | 06C | 0 |
| 0 | 115 | 04D | 0 | 0 | 155 | 06D | 0 |
| 0 | 116 | 04E | 0 | 0 | 156 | 06E | 0 |
| 0 | 117 | 04F | 0 | 0 | 157 | 06F | 0 |
| 0 | 120 | 050 | 2 | 0 | 160 | 070 | A |
| 0 | 121 | 051 | 2 | 0 | 161 | 071 | A |
| 0 | 122 | 052 | 4 | 0 | 162 | 072 | A |
| 0 | 123 | 053 | 4 | 0 | 163 | 073 | 0 |
| 0 | 124 | 054 | 0 | 0 | 164 | 074 | 0 |
| 0 | 125 | 055 | 0 | 0 | 165 | 075 | 0 |
| 0 | 126 | 056 | 0 | 0 | 166 | 076 | 0 |
| 0 | 127 | 057 | 0 | 0 | 167 | 077 | 0 |
| 0 | 130 | 058 | 2 | 0 | 170 | 078 | F |
| 0 | 131 | 059 | 2 | 0 | 171 | 079 | F |
| 0 | 132 | 05A | 2 | 0 | 172 | 07A | F |
| 0 | 133 | 05B | 4 | 0 | 173 | 07B | 0 |
| 0 | 134 | 05C | 0 | 0 | 174 | 07C | 0 |
| 0 | 135 | 05D | 0 | 0 | 175 | 07D | 0 |
| 0 | 136 | 05E | 0 | 0 | 176 | 07E | 0 |
| 0 | 137 | 05F | 0 | 0 | 177 | 07F | 0 |
| 0 | 200 | 080 | 1 | 0 | 240 | 0A0 | 2 |
| 0 | 201 | 081 | 1 | 0 | 241 | 0A1 | 2 |
| 0 | 202 | 082 | 1 | 0 | 242 | 0A2 | 2 |
| 0 | 203 | 083 | 1 | 0 | 243 | 0A3 | 2 |
| 0 | 204 | 084 | 1 | 0 | 244 | 0A4 | 4 |
| 0 | 205 | 085 | 1 | 0 | 245 | 0A5 | 0 |
| 0 | 206 | 086 | 1 | 0 | 246 | 0A6 | 0 |
| 0 | 207 | 087 | 1 | 0 | 247 | 0A7 | 0 |
| 0 | 210 | 088 | 3 | 0 | 250 | 0A8 | A |
| 0 | 211 | 089 | 3 | 0 | 251 | 0A9 | A |
| 0 | 212 | 08A | 3 | 0 | 252 | 0AA | A |
| 0 | 213 | 08B | 3 | 0 | 253 | 0AB | A |
| 0 | 214 | 08C | 3 | 0 | 254 | 0AC | 0 |
| 0 | 215 | 08D | 3 | 0 | 255 | 0AD | 0 |
| 0 | 216 | 08E | 3 | 0 | 256 | 0AE | 0 |

TABLE 2A-continued

DATA COMPARISON PROM OPERATION (OCR)

| E13B SIG. | C/Ax/Ay DATA IN | ADDR (HEX) | PROM CODE | E13B SIG. | C/Ax/Ay DATA IN | ADDR (HEX) | PROM CODE |
|---|---|---|---|---|---|---|---|
| 0 | 217 | 08F | 3 | 0 | 257 | 0AF | 0 |
| 0 | 220 | 090 | 3 | 0 | 260 | 0B0 | A |
| 0 | 221 | 091 | 3 | 0 | 261 | 0B1 | A |
| 0 | 222 | 092 | 5 | 0 | 262 | 0B2 | A |
| 0 | 223 | 093 | 6 | 0 | 263 | 0B3 | A |
| 0 | 224 | 094 | 4 | 0 | 264 | 0B4 | 0 |
| 0 | 225 | 095 | 0 | 0 | 265 | 0B5 | 0 |
| 0 | 226 | 096 | 0 | 0 | 266 | 0B6 | 0 |
| 0 | 227 | 097 | 0 | 0 | 267 | 0B7 | 0 |
| 0 | 230 | 098 | 2 | 0 | 270 | 0B8 | F |
| 0 | 231 | 099 | 2 | 0 | 271 | 0B9 | F |
| 0 | 232 | 09A | 2 | 0 | 272 | 0BA | F |
| 0 | 233 | 09B | 6 | 0 | 273 | 0BB | F |
| 0 | 234 | 09C | 4 | 0 | 274 | 0BC | 0 |
| 0 | 235 | 09D | 0 | 0 | 275 | 0BD | 0 |
| 0 | 236 | 09E | 0 | 0 | 276 | 0BE | 0 |
| 0 | 237 | 09F | 0 | 0 | 277 | 0BF | 0 |
| 0 | 300 | 0C0 | 1 | 0 | 340 | 0E0 | 2 |
| 0 | 301 | 0C1 | 1 | 0 | 341 | 0E1 | 2 |
| 0 | 302 | 0C2 | 1 | 0 | 342 | 0E2 | 2 |
| 0 | 303 | 0C3 | 1 | 0 | 343 | 0E3 | 2 |
| 0 | 304 | 0C4 | 1 | 0 | 344 | 0E4 | 6 |
| 0 | 305 | 0C5 | 1 | 0 | 345 | 0E5 | 4 |
| 0 | 306 | 0C6 | 1 | 0 | 346 | 0E6 | 0 |
| 0 | 307 | 0C7 | 1 | 0 | 347 | 0E7 | 0 |
| 0 | 310 | 0C8 | 3 | 0 | 350 | 0E8 | A |
| 0 | 311 | 0C9 | 3 | 0 | 351 | 0E9 | A |
| 0 | 312 | 0CA | 3 | 0 | 352 | 0EA | A |
| 0 | 313 | 0CB | 3 | 0 | 353 | 0EB | A |
| 0 | 314 | 0CC | 3 | 0 | 354 | 0EC | 2 |
| 0 | 315 | 0CD | 3 | 0 | 355 | 0ED | 4 |
| 0 | 316 | 0CE | 3 | 0 | 356 | 0EE | 0 |
| 0 | 317 | 0CF | 3 | 0 | 357 | 0EF | 0 |
| 0 | 320 | 0D0 | 3 | 0 | 360 | 0F0 | A |
| 0 | 321 | 0D1 | 3 | 0 | 361 | 0F1 | A |
| 0 | 322 | 0D2 | 3 | 0 | 362 | 0F2 | A |
| 0 | 323 | 0D3 | 3 | 0 | 363 | 0F3 | A |
| 0 | 324 | 0D4 | 3 | 0 | 364 | 0F4 | A |
| 0 | 325 | 0D5 | 3 | 0 | 365 | 0F5 | 0 |
| 0 | 326 | 0D6 | 3 | 0 | 366 | 0F6 | 0 |
| 0 | 327 | 0D7 | 3 | 0 | 367 | 0F7 | 0 |
| 0 | 330 | 0D8 | 3 | 0 | 370 | 0F8 | F |
| 0 | 331 | 0D9 | 3 | 0 | 371 | 0F9 | F |
| 0 | 332 | 0DA | 3 | 0 | 372 | 0FA | F |
| 0 | 333 | 0DB | 5 | 0 | 373 | 0FB | F |
| 0 | 334 | 0DC | 6 | 0 | 374 | 0FC | F |
| 0 | 335 | 0DD | 4 | 0 | 375 | 0FD | 0 |
| 0 | 336 | 0DE | 0 | 0 | 376 | 0FE | 0 |
| 0 | 337 | 0DF | 0 | 0 | 377 | 0FF | 0 |
| 0 | 400 | 100 | 1 | 0 | 440 | 120 | 3 |
| 0 | 401 | 101 | 1 | 0 | 441 | 121 | 3 |
| 0 | 402 | 102 | 1 | 0 | 442 | 122 | 3 |
| 0 | 403 | 103 | 1 | 0 | 443 | 123 | 3 |
| 0 | 404 | 104 | 1 | 0 | 444 | 124 | 5 |
| 0 | 405 | 105 | 1 | 0 | 445 | 125 | 6 |
| 0 | 406 | 106 | 1 | 0 | 446 | 126 | 4 |
| 0 | 407 | 107 | 1 | 0 | 447 | 127 | 0 |
| 0 | 410 | 108 | 3 | 0 | 450 | 128 | A |
| 0 | 411 | 109 | 3 | 0 | 451 | 129 | A |
| 0 | 412 | 10A | 3 | 0 | 452 | 12A | A |
| 0 | 413 | 10B | 3 | 0 | 453 | 12B | 2 |
| 0 | 414 | 10C | 3 | 0 | 454 | 12C | 2 |
| 0 | 415 | 10D | 3 | 0 | 455 | 12D | 6 |
| 0 | 416 | 10E | 3 | 0 | 456 | 12E | 4 |
| 0 | 417 | 10F | 3 | 0 | 457 | 12F | 0 |
| 0 | 420 | 110 | 3 | 0 | 460 | 130 | A |
| 0 | 421 | 111 | 3 | 0 | 461 | 131 | A |
| 0 | 422 | 112 | 3 | 0 | 462 | 132 | A |
| 0 | 423 | 113 | 3 | 0 | 463 | 133 | A |
| 0 | 424 | 114 | 3 | 0 | 464 | 134 | A |
| 0 | 425 | 115 | 3 | 0 | 465 | 135 | 2 |
| 0 | 426 | 116 | 3 | 0 | 466 | 136 | 4 |
| 0 | 427 | 117 | 3 | 0 | 467 | 137 | 0 |
| 0 | 430 | 118 | 3 | 0 | 470 | 138 | F |
| 0 | 431 | 119 | 3 | 0 | 471 | 139 | F |
| 0 | 432 | 11A | 3 | 0 | 472 | 13A | F |
| 0 | 433 | 11B | 3 | 0 | 473 | 13B | F |
| 0 | 434 | 11C | 3 | 0 | 474 | 13C | F |
| 0 | 435 | 11D | 3 | 0 | 475 | 13D | F |

TABLE 2A-continued

DATA COMPARISON PROM OPERATION (OCR)

| E13B SIG. | C/Ax/Ay DATA IN | ADDR (HEX) | PROM CODE | E13B SIG. | C/Ax/Ay DATA IN | ADDR (HEX) | PROM CODE |
|---|---|---|---|---|---|---|---|
| 0 | 436 | 11E | 3 | 0 | 476 | 13E | 0 |
| 0 | 437 | 11F | 3 | 0 | 477 | 13F | 0 |
| 0 | 500 | 140 | 1 | 0 | 540 | 160 | 3 |
| 0 | 501 | 141 | 1 | 0 | 541 | 161 | 3 |
| 0 | 502 | 142 | 1 | 0 | 542 | 162 | 3 |
| 0 | 503 | 143 | 1 | 0 | 543 | 163 | 3 |
| 0 | 504 | 144 | 1 | 0 | 544 | 164 | 3 |
| 0 | 505 | 145 | 1 | 0 | 545 | 165 | 3 |
| 0 | 506 | 146 | 1 | 0 | 546 | 166 | 3 |
| 0 | 507 | 147 | 1 | 0 | 547 | 167 | 3 |
| 0 | 510 | 148 | 3 | 0 | 550 | 168 | 3 |
| 0 | 511 | 149 | 3 | 0 | 551 | 169 | 3 |
| 0 | 512 | 14A | 3 | 0 | 552 | 16A | 3 |
| 0 | 513 | 14B | 3 | 0 | 553 | 16B | 3 |
| 0 | 514 | 14C | 3 | 0 | 554 | 16C | 3 |
| 0 | 515 | 14D | 3 | 0 | 555 | 16D | 5 |
| 0 | 516 | 14E | 3 | 0 | 556 | 16E | 6 |
| 0 | 517 | 14F | 3 | 0 | 557 | 16F | 4 |
| 0 | 520 | 150 | 3 | 0 | 560 | 170 | 2 |
| 0 | 521 | 151 | 3 | 0 | 561 | 171 | 2 |
| 0 | 522 | 152 | 3 | 0 | 562 | 172 | 2 |
| 0 | 523 | 153 | 3 | 0 | 563 | 173 | 2 |
| 0 | 524 | 154 | 3 | 0 | 564 | 174 | 2 |
| 0 | 525 | 155 | 3 | 0 | 565 | 175 | 2 |
| 0 | 526 | 156 | 3 | 0 | 566 | 176 | 6 |
| 0 | 527 | 157 | 3 | 0 | 567 | 177 | 4 |
| 0 | 530 | 158 | 3 | 0 | 570 | 178 | F |
| 0 | 531 | 159 | 3 | 0 | 571 | 179 | F |
| 0 | 532 | 15A | 3 | 0 | 572 | 17A | F |
| 0 | 533 | 15B | 3 | 0 | 573 | 17B | F |
| 0 | 534 | 15C | 3 | 0 | 574 | 17C | F |
| 0 | 535 | 15D | 3 | 0 | 575 | 17D | F |
| 0 | 536 | 15E | 3 | 0 | 576 | 17E | F |
| 0 | 537 | 15F | 3 | 0 | 577 | 17F | 4 |
| 0 | 600 | 180 | 1 | 0 | 640 | 1A0 | 3 |
| 0 | 601 | 181 | 1 | 0 | 641 | 1A1 | 3 |
| 0 | 602 | 182 | 1 | 0 | 642 | 1A2 | 3 |
| 0 | 603 | 183 | 1 | 0 | 643 | 1A3 | 3 |
| 0 | 604 | 184 | 1 | 0 | 644 | 1A4 | 3 |
| 0 | 605 | 185 | 1 | 0 | 645 | 1A5 | 3 |
| 0 | 606 | 186 | 1 | 0 | 646 | 1A6 | 3 |
| 0 | 607 | 187 | 1 | 0 | 647 | 1A7 | 3 |
| 0 | 610 | 188 | 3 | 0 | 650 | 1A8 | 3 |
| 0 | 611 | 189 | 3 | 0 | 651 | 1A9 | 3 |
| 0 | 612 | 18A | 3 | 0 | 652 | 1AA | 3 |
| 0 | 613 | 18B | 3 | 0 | 653 | 1AB | 3 |
| 0 | 614 | 18C | 3 | 0 | 654 | 1AC | 3 |
| 0 | 615 | 18D | 3 | 0 | 655 | 1AD | 3 |
| 0 | 616 | 18E | 3 | 0 | 656 | 1AE | 3 |
| 0 | 617 | 18F | 3 | 0 | 657 | 1AF | 3 |
| 0 | 620 | 190 | 3 | 0 | 660 | 1B0 | 3 |
| 0 | 621 | 191 | 3 | 0 | 661 | 1B1 | 3 |
| 0 | 622 | 192 | 3 | 0 | 662 | 1B2 | 3 |
| 0 | 623 | 193 | 3 | 0 | 663 | 1B3 | 3 |
| 0 | 624 | 194 | 3 | 0 | 664 | 1B4 | 3 |
| 0 | 625 | 195 | 3 | 0 | 665 | 1B5 | 3 |
| 0 | 626 | 196 | 3 | 0 | 666 | 1B6 | 5 |
| 0 | 627 | 197 | 3 | 0 | 667 | 1B7 | 6 |
| 0 | 630 | 198 | 3 | 0 | 670 | 1B8 | F |
| 0 | 631 | 199 | 3 | 0 | 671 | 1B9 | F |
| 0 | 632 | 19A | 3 | 0 | 672 | 1BA | F |
| 0 | 633 | 19B | 3 | 0 | 673 | 1BB | F |
| 0 | 634 | 19C | 3 | 0 | 674 | 1BC | F |
| 0 | 635 | 19D | 3 | 0 | 675 | 1BD | F |
| 0 | 636 | 19E | 3 | 0 | 676 | 1BE | F |
| 0 | 637 | 19F | 3 | 0 | 677 | 1BF | 6 |
| 0 | 700 | 1C0 | F | 0 | 740 | 1E0 | F |
| 0 | 701 | 1C1 | F | 0 | 741 | 1E1 | F |
| 0 | 702 | 1C2 | F | 0 | 742 | 1E2 | F |
| 0 | 703 | 1C3 | F | 0 | 743 | 1E3 | F |
| 0 | 704 | 1C4 | F | 0 | 744 | 1E4 | F |
| 0 | 705 | 1C5 | F | 0 | 745 | 1E5 | F |
| 0 | 706 | 1C6 | F | 0 | 746 | 1E6 | F |
| 0 | 707 | 1C7 | F | 0 | 747 | 1E7 | F |
| 0 | 710 | 1C8 | F | 0 | 750 | 1E8 | F |
| 0 | 711 | 1C9 | F | 0 | 751 | 1E9 | F |
| 0 | 712 | 1CA | F | 0 | 752 | 1EA | F |
| 0 | 713 | 1CB | F | 0 | 753 | 1EB | F |
| 0 | 714 | 1CC | F | 0 | 754 | 1EC | F |

TABLE 2A-continued

DATA COMPARISON PROM OPERATION (OCR)

| E13B SIG. | C/Ax/Ay DATA IN | ADDR (HEX) | PROM CODE | E13B SIG. | C/Ax/Ay DATA IN | ADDR (HEX) | PROM CODE |
|---|---|---|---|---|---|---|---|
| 0 | 715 | 1CD | F | 0 | 755 | 1ED | F |
| 0 | 716 | 1CE | F | 0 | 756 | 1EE | F |
| 0 | 717 | 1CF | F | 0 | 757 | 1EF | F |
| 0 | 720 | 1D0 | F | 0 | 760 | 1F0 | F |
| 0 | 721 | 1D1 | F | 0 | 761 | 1F1 | F |
| 0 | 722 | 1D2 | F | 0 | 762 | 1F2 | F |
| 0 | 723 | 1D3 | F | 0 | 763 | 1F3 | F |
| 0 | 724 | 1D4 | F | 0 | 764 | 1F4 | F |
| 0 | 725 | 1D5 | F | 0 | 765 | 1F5 | F |
| 0 | 726 | 1D6 | F | 0 | 766 | 1F6 | F |
| 0 | 727 | 1D7 | F | 0 | 767 | 1F7 | F |
| 0 | 730 | 1D8 | F | 0 | 770 | 1F8 | F |
| 0 | 731 | 1D9 | F | 0 | 771 | 1F9 | F |
| 0 | 732 | 1DA | F | 0 | 772 | 1FA | F |
| 0 | 733 | 1DB | F | 0 | 773 | 1FB | F |
| 0 | 734 | 1DC | F | 0 | 774 | 1FC | F |
| 0 | 735 | 1DD | F | 0 | 775 | 1FD | F |
| 0 | 736 | 1DE | F | 0 | 776 | 1FE | F |
| 0 | 737 | 1DF | F | 0 | 777 | 1FF | F |

A different algorithm is stored in each of the data comparison PROMs 141-144 for the optical reading of E13B (MICR or magnetic ink character recognition font). E13B is not a constant strokewidth font. E13B has such a high PCS (print contrast signal) that the lower threshold level pixel signals from the A/D converter 49 and pixel data selector 53 (FIG. 5) can be ignored to make the PROMs 141-144 blind to the majority of borders, pen strokes and scenic backgrounds that often occur on such documents as checks. TABLE 3 shows the algorithm stored in the PROMs 141-144 for reading E13B. This E13B data comparison algorithm is made available to read E13B font when the E13B line to each of the PROMs 141-144 goes high or to a 1 state. TABLE 3 shows only 5 output PROM codes, the 5 possible conditions that produce those 5 codes, when the 5 conditions occur and an explanation of the conditions. TABLE 3A provides a comprehensive list of various E13B, C, Ax and Ay inputs which form hexadecimal addresses to produce associated PROM code outputs for the data comparison PROMs 141-144 during an E13B reading operation.

TABLE 3

E13B DATA COMPARISON ALGORITHM

| PROM CODE | CONDITION | WHEN | EXPLANATION |
|---|---|---|---|
| C | PC (Possible Corner) | (C=5) and (Ax=6) and (Ay=6 or 7) (C=5) and (Ax=7) and (Ay=7) | Prevents Corner pixels from being turned white. |
| D | B$_0$ (Border) | (C=3 or 4) and (Ax=0) (C=5) and (Ax=0 or 1) | With a Thin Segment detected on same axis but opposite side, will turn 2 pixels of a Thin MICR Segment Black. |
| E | TS (Thin Segment) | (C=3 or 4 or 5) and (Ax=5) and (Ay=0 or 1) (C=5) and (Ax=3 or 4) and (Ay=0) | Will turn 2 pixels of a Thin MICR Segment black if light on both sides. Requires Border condition on opposite side. |
| F | B (Black) | C=6 or 7 (Ax=6 or 7) and (C≧(Ay−1) and C≧0) | Levels of 6 and 7 indicate MICR ink. Minimum segment width will be 2 or 3 pixels. |
| 0 | W (White) | All other possibilities | Anything that does not meet the above condition is turned white. |

TABLE 3A

DATA COMPARISON PROM OPERATION (E13B)

| E13B SIG. | C/Ax/Ay DATA IN | ADDR (HEX) | PROM CODE | E13B SIG. | C/Ax/Ay/ DATA IN | ADDR (HEX) | PROM CODE |
|---|---|---|---|---|---|---|---|
| 1 | 000 | 200 | 0 | 1 | 040 | 220 | 0 |
| 1 | 001 | 201 | 0 | 1 | 041 | 221 | 0 |
| 1 | 002 | 202 | 0 | 1 | 042 | 222 | 0 |
| 1 | 003 | 203 | 0 | 1 | 043 | 223 | 0 |
| 1 | 004 | 204 | 0 | 1 | 044 | 224 | 0 |
| 1 | 005 | 205 | 0 | 1 | 045 | 225 | 0 |
| 1 | 006 | 206 | 0 | 1 | 046 | 226 | 0 |
| 1 | 007 | 207 | 0 | 1 | 047 | 227 | 0 |
| 1 | 010 | 208 | 0 | 1 | 050 | 228 | 0 |
| 1 | 011 | 209 | 0 | 1 | 051 | 229 | 0 |
| 1 | 012 | 20A | 0 | 1 | 052 | 22A | 0 |
| 1 | 013 | 20B | 0 | 1 | 053 | 22B | 0 |
| 1 | 014 | 20C | 0 | 1 | 054 | 22C | 0 |
| 1 | 015 | 20D | 0 | 1 | 055 | 22D | 0 |

TABLE 3A-continued

DATA COMPARISON PROM OPERATION (E13B)

| E13B SIG. | C/Ax/Ay DATA IN | ADDR (HEX) | PROM CODE | E13B SIG. | C/Ax/Ay/ DATA IN | ADDR (HEX) | PROM CODE |
|---|---|---|---|---|---|---|---|
| 1 | 016 | 20E | 0 | 1 | 056 | 22E | 0 |
| 1 | 017 | 20F | 0 | 1 | 057 | 22F | 0 |
| 1 | 020 | 210 | 0 | 1 | 060 | 230 | 0 |
| 1 | 021 | 211 | 0 | 1 | 061 | 231 | 0 |
| 1 | 022 | 212 | 0 | 1 | 062 | 232 | 0 |
| 1 | 023 | 213 | 0 | 1 | 063 | 233 | 0 |
| 1 | 024 | 214 | 0 | 1 | 064 | 234 | 0 |
| 1 | 025 | 215 | 0 | 1 | 065 | 235 | 0 |
| 1 | 026 | 216 | 0 | 1 | 066 | 236 | 0 |
| 1 | 027 | 217 | 0 | 1 | 067 | 237 | 0 |
| 1 | 030 | 218 | 0 | 1 | 070 | 238 | 0 |
| 1 | 031 | 219 | 0 | 1 | 071 | 239 | 0 |
| 1 | 032 | 21A | 0 | 1 | 072 | 23A | 0 |
| 1 | 033 | 21B | 0 | 1 | 073 | 23B | 0 |
| 1 | 034 | 21C | 0 | 1 | 074 | 23C | 0 |
| 1 | 035 | 21D | 0 | 1 | 075 | 23D | 0 |
| 1 | 036 | 21E | 0 | 1 | 076 | 23E | 0 |
| 1 | 037 | 21F | 0 | 1 | 077 | 23F | 0 |
| 1 | 100 | 240 | 0 | 1 | 140 | 260 | 0 |
| 1 | 101 | 241 | 0 | 1 | 141 | 261 | 0 |
| 1 | 102 | 242 | 0 | 1 | 142 | 262 | 0 |
| 1 | 103 | 243 | 0 | 1 | 143 | 263 | 0 |
| 1 | 104 | 244 | 0 | 1 | 144 | 264 | 0 |
| 1 | 105 | 245 | 0 | 1 | 145 | 265 | 0 |
| 1 | 106 | 246 | 0 | 1 | 146 | 266 | 0 |
| 1 | 107 | 247 | 0 | 1 | 147 | 267 | 0 |
| 1 | 110 | 248 | 0 | 1 | 150 | 268 | 0 |
| 1 | 111 | 249 | 0 | 1 | 151 | 269 | 0 |
| 1 | 112 | 24A | 0 | 1 | 152 | 26A | 0 |
| 1 | 113 | 24B | 0 | 1 | 153 | 26B | 0 |
| 1 | 114 | 24C | 0 | 1 | 154 | 26C | 0 |
| 1 | 115 | 24D | 0 | 1 | 155 | 26D | 0 |
| 1 | 116 | 24E | 0 | 1 | 156 | 26E | 0 |
| 1 | 117 | 24F | 0 | 1 | 157 | 26F | 0 |
| 1 | 120 | 250 | 0 | 1 | 160 | 270 | F |
| 1 | 121 | 251 | 0 | 1 | 161 | 271 | F |
| 1 | 122 | 252 | 0 | 1 | 162 | 272 | F |
| 1 | 123 | 253 | 0 | 1 | 163 | 273 | 0 |
| 1 | 124 | 254 | 0 | 1 | 164 | 274 | 0 |
| 1 | 125 | 255 | 0 | 1 | 165 | 275 | 0 |
| 1 | 126 | 256 | 0 | 1 | 166 | 276 | 0 |
| 1 | 127 | 257 | 0 | 1 | 167 | 277 | 0 |
| 1 | 130 | 258 | 0 | 1 | 170 | 278 | F |
| 1 | 131 | 259 | 0 | 1 | 171 | 279 | F |
| 1 | 132 | 25A | 0 | 1 | 172 | 27A | F |
| 1 | 133 | 25B | 0 | 1 | 173 | 27B | 0 |
| 1 | 134 | 25C | 0 | 1 | 174 | 27C | 0 |
| 1 | 135 | 25D | 0 | 1 | 175 | 27D | 0 |
| 1 | 136 | 25E | 0 | 1 | 176 | 27E | 0 |
| 1 | 137 | 25F | 0 | 1 | 177 | 27F | 0 |
| 1 | 200 | 280 | 0 | 1 | 240 | 2A0 | 0 |
| 1 | 201 | 281 | 0 | 1 | 241 | 2A1 | 0 |
| 1 | 202 | 282 | 0 | 1 | 242 | 2A2 | 0 |
| 1 | 203 | 283 | 0 | 1 | 243 | 2A3 | 0 |
| 1 | 204 | 284 | 0 | 1 | 244 | 2A4 | 0 |
| 1 | 205 | 285 | 0 | 1 | 245 | 2A5 | 0 |
| 1 | 206 | 286 | 0 | 1 | 246 | 2A6 | 0 |
| 1 | 207 | 287 | 0 | 1 | 247 | 2A7 | 0 |
| 1 | 210 | 288 | 0 | 1 | 250 | 2A8 | 0 |
| 1 | 211 | 289 | 0 | 1 | 251 | 2A9 | 0 |
| 1 | 212 | 28A | 0 | 1 | 252 | 2AA | 0 |
| 1 | 213 | 28B | 0 | 1 | 253 | 2AB | 0 |
| 1 | 214 | 28C | 0 | 1 | 254 | 2AC | 0 |
| 1 | 215 | 28D | 0 | 1 | 255 | 2AD | 0 |
| 1 | 216 | 28E | 0 | 1 | 256 | 2AE | 0 |
| 1 | 217 | 28F | 0 | 1 | 257 | 2AF | 0 |
| 1 | 220 | 290 | 0 | 1 | 260 | 2B0 | F |
| 1 | 221 | 291 | 0 | 1 | 261 | 2B1 | F |
| 1 | 222 | 292 | 0 | 1 | 262 | 2B2 | F |
| 1 | 223 | 293 | 0 | 1 | 263 | 2B3 | F |
| 1 | 224 | 294 | 0 | 1 | 264 | 2B4 | 0 |
| 1 | 225 | 295 | 0 | 1 | 265 | 2B5 | 0 |
| 1 | 226 | 296 | 0 | 1 | 266 | 2B6 | 0 |
| 1 | 227 | 297 | 0 | 1 | 267 | 2B7 | 0 |
| 1 | 230 | 298 | 0 | 1 | 270 | 2B8 | F |
| 1 | 231 | 299 | 0 | 1 | 271 | 2B9 | F |
| 1 | 232 | 29A | 0 | 1 | 272 | 2BA | F |
| 1 | 233 | 29B | 0 | 1 | 273 | 2BB | F |
| 1 | 234 | 29C | 0 | 1 | 274 | 2BC | 0 |

TABLE 3A-continued
DATA COMPARISON PROM OPERATION (E13B)

| E13B SIG. | C/Ax/Ay DATA IN | ADDR (HEX) | PROM CODE | E13B SIG. | C/Ax/Ay/ DATA IN | ADDR (HEX) | PROM CODE |
|---|---|---|---|---|---|---|---|
| 1 | 235 | 29D | 0 | 1 | 275 | 2BD | 0 |
| 1 | 236 | 29E | 0 | 1 | 276 | 2BE | 0 |
| 1 | 237 | 29F | 0 | 1 | 277 | 2BF | 0 |
| 1 | 300 | 2C0 | D | 1 | 340 | 2E0 | 0 |
| 1 | 301 | 2C1 | D | 1 | 341 | 2E1 | 0 |
| 1 | 302 | 2C2 | D | 1 | 342 | 2E2 | 0 |
| 1 | 303 | 2C3 | D | 1 | 343 | 2E3 | 0 |
| 1 | 304 | 2C4 | D | 1 | 344 | 2E4 | 0 |
| 1 | 305 | 2C5 | D | 1 | 345 | 2E5 | 0 |
| 1 | 306 | 2C6 | D | 1 | 346 | 2E6 | 0 |
| 1 | 307 | 2C7 | D | 1 | 347 | 2E7 | 0 |
| 1 | 310 | 2C8 | 0 | 1 | 350 | 2E8 | E |
| 1 | 311 | 2C9 | 0 | 1 | 351 | 2E9 | E |
| 1 | 312 | 2CA | 0 | 1 | 352 | 2EA | 0 |
| 1 | 313 | 2CB | 0 | 1 | 353 | 2EB | 0 |
| 1 | 314 | 2CC | 0 | 1 | 354 | 2EC | 0 |
| 1 | 315 | 2CD | 0 | 1 | 355 | 2ED | 0 |
| 1 | 316 | 2CE | 0 | 1 | 356 | 2EE | 0 |
| 1 | 317 | 2CF | 0 | 1 | 357 | 2EF | 0 |
| 1 | 320 | 2D0 | 0 | 1 | 360 | 2F0 | F |
| 1 | 321 | 2D1 | 0 | 1 | 361 | 2F1 | F |
| 1 | 322 | 2D2 | 0 | 1 | 362 | 2F2 | F |
| 1 | 323 | 2D3 | 0 | 1 | 363 | 2F3 | F |
| 1 | 324 | 2D4 | 0 | 1 | 364 | 2F4 | F |
| 1 | 325 | 2D5 | 0 | 1 | 365 | 2F5 | 0 |
| 1 | 326 | 2D6 | 0 | 1 | 366 | 2F6 | 0 |
| 1 | 327 | 2D7 | 0 | 1 | 367 | 2F7 | 0 |
| 1 | 330 | 2D8 | 0 | 1 | 370 | 2F8 | F |
| 1 | 331 | 2D9 | 0 | 1 | 371 | 2F9 | F |
| 1 | 332 | 2DA | 0 | 1 | 372 | 2FA | F |
| 1 | 333 | 2DB | 0 | 1 | 373 | 2FB | F |
| 1 | 334 | 2DC | 0 | 1 | 374 | 2FC | F |
| 1 | 335 | 2DD | 0 | 1 | 375 | 2FD | 0 |
| 1 | 336 | 2DE | 0 | 1 | 376 | 2FE | 0 |
| 1 | 337 | 2DF | 0 | 1 | 377 | 2FF | 0 |
| 1 | 400 | 300 | D | 1 | 440 | 320 | 0 |
| 1 | 401 | 301 | D | 1 | 441 | 321 | 0 |
| 1 | 402 | 302 | D | 1 | 442 | 322 | 0 |
| 1 | 403 | 303 | D | 1 | 443 | 323 | 0 |
| 1 | 404 | 304 | D | 1 | 444 | 324 | 0 |
| 1 | 405 | 305 | D | 1 | 445 | 325 | 0 |
| 1 | 406 | 306 | D | 1 | 446 | 326 | 0 |
| 1 | 407 | 307 | D | 1 | 447 | 327 | 0 |
| 1 | 410 | 308 | 0 | 1 | 450 | 328 | E |
| 1 | 411 | 309 | 0 | 1 | 451 | 329 | E |
| 1 | 412 | 30A | 0 | 1 | 452 | 32A | 0 |
| 1 | 413 | 30B | 0 | 1 | 453 | 32B | 0 |
| 1 | 414 | 30C | 0 | 1 | 454 | 32C | 0 |
| 1 | 415 | 30D | 0 | 1 | 455 | 32D | 0 |
| 1 | 416 | 30E | 0 | 1 | 456 | 32E | 0 |
| 1 | 417 | 30F | 0 | 1 | 457 | 32F | 0 |
| 1 | 420 | 310 | 0 | 1 | 460 | 330 | F |
| 1 | 421 | 311 | 0 | 1 | 461 | 331 | F |
| 1 | 422 | 312 | 0 | 1 | 462 | 332 | F |
| 1 | 423 | 313 | 0 | 1 | 463 | 333 | F |
| 1 | 424 | 314 | 0 | 1 | 464 | 334 | F |
| 1 | 425 | 315 | 0 | 1 | 465 | 335 | F |
| 1 | 426 | 316 | 0 | 1 | 466 | 336 | 0 |
| 1 | 427 | 317 | 0 | 1 | 467 | 337 | 0 |
| 1 | 430 | 318 | 0 | 1 | 470 | 338 | F |
| 1 | 431 | 319 | 0 | 1 | 471 | 339 | F |
| 1 | 432 | 31A | 0 | 1 | 472 | 33A | F |
| 1 | 433 | 31B | 0 | 1 | 473 | 33B | F |
| 1 | 434 | 31C | 0 | 1 | 474 | 33C | F |
| 1 | 435 | 31D | 0 | 1 | 475 | 33D | F |
| 1 | 436 | 31E | 0 | 1 | 476 | 33E | 0 |
| 1 | 437 | 31F | 0 | 1 | 477 | 33F | 0 |
| 1 | 500 | 340 | D | 1 | 540 | 360 | E |
| 1 | 501 | 341 | D | 1 | 541 | 361 | 0 |
| 1 | 502 | 342 | D | 1 | 542 | 362 | 0 |
| 1 | 503 | 343 | D | 1 | 543 | 363 | 0 |
| 1 | 504 | 344 | D | 1 | 544 | 364 | 0 |
| 1 | 505 | 345 | D | 1 | 545 | 365 | 0 |
| 1 | 506 | 346 | D | 1 | 546 | 366 | 0 |
| 1 | 507 | 347 | D | 1 | 547 | 367 | 0 |
| 1 | 510 | 348 | D | 1 | 550 | 368 | E |
| 1 | 511 | 349 | D | 1 | 551 | 369 | E |
| 1 | 512 | 34A | D | 1 | 552 | 36A | 0 |
| 1 | 513 | 34B | D | 1 | 553 | 36B | 0 |

TABLE 3A-continued
DATA COMPARISON PROM OPERATION (E13B)

| E13B SIG. | C/Ax/Ay DATA IN | ADDR (HEX) | PROM CODE | E13B SIG. | C/Ax/Ay/ DATA IN | ADDR (HEX) | PROM CODE |
|---|---|---|---|---|---|---|---|
| 1 | 514 | 34C | D | 1 | 554 | 36C | 0 |
| 1 | 515 | 34D | D | 1 | 555 | 36D | 0 |
| 1 | 516 | 34E | D | 1 | 556 | 36E | 0 |
| 1 | 517 | 34F | D | 1 | 557 | 36F | 0 |
| 1 | 520 | 350 | 0 | 1 | 560 | 370 | F |
| 1 | 521 | 351 | 0 | 1 | 561 | 371 | F |
| 1 | 522 | 352 | 0 | 1 | 562 | 372 | F |
| 1 | 523 | 353 | 0 | 1 | 563 | 373 | F |
| 1 | 524 | 354 | 0 | 1 | 564 | 374 | F |
| 1 | 525 | 355 | 0 | 1 | 565 | 375 | F |
| 1 | 526 | 356 | 0 | 1 | 566 | 376 | C |
| 1 | 527 | 357 | 0 | 1 | 567 | 377 | C |
| 1 | 530 | 358 | E | 1 | 570 | 378 | F |
| 1 | 531 | 359 | 0 | 1 | 571 | 379 | F |
| 1 | 532 | 35A | 0 | 1 | 572 | 37A | F |
| 1 | 533 | 35B | 0 | 1 | 573 | 37B | F |
| 1 | 534 | 35C | 0 | 1 | 574 | 37C | F |
| 1 | 535 | 35D | 0 | 1 | 575 | 37D | F |
| 1 | 536 | 35E | 0 | 1 | 576 | 37E | F |
| 1 | 537 | 35F | 0 | 1 | 577 | 37F | C |
| 1 | 600 | 380 | F | 1 | 640 | 3A0 | F |
| 1 | 601 | 381 | F | 1 | 641 | 3A1 | F |
| 1 | 602 | 382 | F | 1 | 642 | 3A2 | F |
| 1 | 603 | 383 | F | 1 | 643 | 3A3 | F |
| 1 | 604 | 384 | F | 1 | 644 | 3A4 | F |
| 1 | 605 | 385 | F | 1 | 645 | 3A5 | F |
| 1 | 606 | 386 | F | 1 | 646 | 3A6 | F |
| 1 | 607 | 387 | F | 1 | 647 | 3A7 | F |
| 1 | 610 | 388 | F | 1 | 650 | 3A8 | F |
| 1 | 611 | 389 | F | 1 | 651 | 3A9 | F |
| 1 | 612 | 38A | F | 1 | 652 | 3AA | F |
| 1 | 613 | 38B | F | 1 | 653 | 3AB | F |
| 1 | 614 | 38C | F | 1 | 654 | 3AC | F |
| 1 | 615 | 38D | F | 1 | 655 | 3AD | F |
| 1 | 616 | 38E | F | 1 | 656 | 3AE | F |
| 1 | 617 | 38F | F | 1 | 657 | 3AF | F |
| 1 | 620 | 390 | F | 1 | 660 | 3B0 | F |
| 1 | 621 | 391 | F | 1 | 661 | 3B1 | F |
| 1 | 622 | 392 | F | 1 | 662 | 3B2 | F |
| 1 | 623 | 393 | F | 1 | 663 | 3B3 | F |
| 1 | 624 | 394 | F | 1 | 664 | 3B4 | F |
| 1 | 625 | 395 | F | 1 | 665 | 3B5 | F |
| 1 | 626 | 396 | F | 1 | 666 | 3B6 | F |
| 1 | 627 | 397 | F | 1 | 667 | 3B7 | F |
| 1 | 630 | 398 | F | 1 | 670 | 3B8 | F |
| 1 | 631 | 399 | F | 1 | 671 | 3B9 | F |
| 1 | 632 | 39A | F | 1 | 672 | 3BA | F |
| 1 | 633 | 39B | F | 1 | 673 | 3BB | F |
| 1 | 634 | 39C | F | 1 | 674 | 3BC | F |
| 1 | 635 | 39D | F | 1 | 675 | 3BD | F |
| 1 | 636 | 39E | F | 1 | 676 | 3BE | F |
| 1 | 637 | 39F | F | 1 | 677 | 3BF | 6 |
| 1 | 700 | 3C0 | F | 1 | 740 | 3E0 | F |
| 1 | 701 | 3C1 | F | 1 | 741 | 3E1 | F |
| 1 | 702 | 3C2 | F | 1 | 742 | 3E2 | F |
| 1 | 703 | 3C3 | F | 1 | 743 | 3E3 | F |
| 1 | 704 | 3C4 | F | 1 | 744 | 3E4 | F |
| 1 | 705 | 3C5 | F | 1 | 745 | 3E5 | F |
| 1 | 706 | 3C6 | F | 1 | 746 | 3E6 | F |
| 1 | 707 | 3C7 | F | 1 | 747 | 3E7 | F |
| 1 | 710 | 3C8 | F | 1 | 750 | 3E8 | F |
| 1 | 711 | 3C9 | F | 1 | 751 | 3E9 | F |
| 1 | 712 | 3CA | F | 1 | 752 | 3EA | F |
| 1 | 713 | 3CB | F | 1 | 753 | 3EB | F |
| 1 | 714 | 3CC | F | 1 | 754 | 3EC | F |
| 1 | 715 | 3CD | F | 1 | 755 | 3ED | F |
| 1 | 716 | 3CE | F | 1 | 756 | 3EE | F |
| 1 | 717 | 3CF | F | 1 | 757 | 3EF | F |
| 1 | 720 | 3D0 | F | 1 | 760 | 3F0 | F |
| 1 | 721 | 3D1 | F | 1 | 761 | 3F1 | F |
| 1 | 722 | 3D2 | F | 1 | 762 | 3F2 | F |
| 1 | 723 | 3D3 | F | 1 | 763 | 3F3 | F |
| 1 | 724 | 3D4 | F | 1 | 764 | 3F4 | F |
| 1 | 725 | 3D5 | F | 1 | 765 | 3F5 | F |
| 1 | 726 | 3D6 | F | 1 | 766 | 3F6 | F |
| 1 | 727 | 3D7 | F | 1 | 767 | 3F7 | F |
| 1 | 730 | 3D8 | F | 1 | 770 | 3F8 | F |
| 1 | 731 | 3D9 | F | 1 | 771 | 3F9 | F |
| 1 | 732 | 3DA | F | 1 | 772 | 3FA | F |

TABLE 3A-continued

| | DATA COMPARISON PROM OPERATION (E13B) | | | | | | |
|---|---|---|---|---|---|---|---|
| E13B SIG. | C/Ax/Ay DATA IN | ADDR (HEX) | PROM CODE | E13B SIG. | C/Ax/Ay/ DATA IN | ADDR (HEX) | PROM CODE |
| 1 | 733 | 3DB | F | 1 | 773 | 3FB | F |
| 1 | 734 | 3DC | F | 1 | 774 | 3FC | F |
| 1 | 735 | 3DD | F | 1 | 775 | 3FD | F |
| 1 | 736 | 3DE | F | 1 | 776 | 3FE | F |
| 1 | 737 | 3DF | F | 1 | 777 | 3FF | F |

The second level of PROMs comprises vertical (V) axis decision PROM 146 and horizontal (H) axis decision PROM 145. These PROMs 145 and 146 are similar in structure and operation and store the same axis decision algorithm in 256 four-bit wide memory locations. Axis decision PROM 145 compares the two 4-bit input codes from data comparison PROMs 141 and 142 by using those codes as an 8-bit input hexadecimal address. In response to this address, the PROM 145 outputs a 4-bit code related to a horizontal axis decision. Similarly, axis decision PROM 146 compares the two 4-bit input codes from data comparison PROMs 143 and 144 by using those codes as an 8-bit input hexadecimal address. In response to this address the PROM 146 outputs a 4-bit code related to a vertical axis decision.

The axis decision algorithm stored in each of the PROMs 145 and 146 is shown in TABLE 4. In response to the input codes each of the PROMs 145 and 146 outputs an associated one of the indicated 12 output codes shown in TABLE 4. Note that in TABLE 4 there are no input codes shown for 7, 9 and B. Input codes 7, 9 and B are "don't care" codes which are not programmed in the PROMs 145 and 146. TABLE 5 shows the 12 conditions which cause the axis decision PROMs 145 and 146 to produce the 12 output codes.

TABLE 4

| | AXIS DECISION ALGORITHM | | | | | | | | | | | |
|---|---|---|---|---|---|---|---|---|---|---|---|---|
| INPUT CODE | INPUT CODE | | | | | | | | | | | |
| | 0 | 1 | 2 | 3 | 4 | 5 | 6 | 8 | A | C | D | E | F |
| 0 | 0 | 0 | 0 | 0 | 0 | 0 | 0 | 0 | B | 0 | 0 | F |
| 1 | 0 | A | 2 | 2 | 1 | 6 | 7 | 8 | 3 | 0 | 0 | 0 | F |
| 2 | 0 | 2 | 2 | 2 | 2 | 2 | 2 | 2 | 3 | 0 | 0 | 0 | F |
| 3 | 0 | 2 | 2 | 2 | 4 | 6 | 5 | 8 | 3 | 0 | 0 | 0 | F |
| 4 | 0 | 1 | 2 | 4 | 4 | 8 | 4 | 8 | 3 | 0 | 0 | 0 | F |
| 5 | 0 | 6 | 2 | 6 | 8 | 8 | 8 | 8 | 3 | 0 | 0 | 0 | F |
| 6 | 0 | 7 | 2 | 5 | 4 | 8 | 4 | 8 | 3 | 0 | 0 | 0 | F |
| 8 | 0 | 8 | 2 | 8 | 8 | 8 | 8 | 3 | 0 | 0 | 0 | F |
| A | 0 | 3 | 3 | 3 | 3 | 3 | 3 | 3 | 0 | 0 | 0 | F |
| C | B | 0 | 0 | 0 | 0 | 0 | 0 | 0 | B | 0 | F |
| D | 0 | 0 | 0 | 0 | 0 | 0 | 0 | 0 | B | 0 | F | F |
| E | 0 | 0 | 0 | 0 | 0 | 0 | 0 | 0 | F | 0 | F |
| F | F | F | F | F | F | F | F | F | F | F | F | F |

TABLE 5

| AXIS DECISION PROM OUTPUTS | | |
|---|---|---|
| OUTPUT CODE | CONDITION | |
| 0 | W | (White) |
| 1 | RS | (Remove if Segment. End of Segment Condition Exists) |
| 2 | S | (Segment) |
| 3 | TDS | (Thin Dark Segment) |
| 4 | R | (Remove, turn white) |
| 5 | PCW | (Possible Corner, but turn white if not a corner.) |
| 6 | PC | (Possible Corner. Other Axis decides fate if not Corner.) |
| 7 | PC,RS | (Possible Corner and Remove if Segment) |
| 8 | ND | (No Decision. Opposite Axis decides fate) |
| A | PS | (Possible Single Pixel. Will turn White if so.) |
| B | PC | (E13B) (Possible Corner condition for E13B) |
| F | B | (Black. Turn Pixel Black) |

The 4-bit input codes from the axis decision PROMs 145 and 146 are then compared in a black/white (B/W) decision PROM 147. The PROM 147, which has 256 by 4-bit memory locations, makes the final decision on whether to turn the center pixel signal C black or white as a function of the 8-bit input address formed from the two 4-bit input codes. The black/white decision algorithm stored in the PROM 147 is shown in TABLE 6. Note that in TABLE 6 there are no input codes shown for 9, C, D and E. These codes are "don't care" codes which are not programmed in the PROM 147.

TABLE 6

| | BLACK/WHITE DECISION ALGORITHM | | | | | | | | | | |
|---|---|---|---|---|---|---|---|---|---|---|---|
| INPUT CODE | INPUT CODE | | | | | | | | | | |
| | 0 | 1 | 2 | 3 | 4 | 5 | 6 | 7 | 8 | A | B | F |
| 0 | W | W | W | B | W | W | W | W | W | W | W | B |
| 1 | W | W | W | W | W | W | W | W | W | W | W | B |
| 2 | W | W | B | B | B | B | B | W | B | B | W | B |
| 3 | B | W | B | B | B | B | W | B | W | B | W | B |
| 4 | W | W | B | W | B | W | W | W | W | B | W | B |
| 5 | W | W | B | W | B | W | B | B | W | B | W | B |
| 6 | W | W | B | B | W | B | B | B | B | W | B |
| 7 | W | W | W | W | W | B | B | B | W | W | W | B |
| 8 | W | W | B | W | B | W | W | B | W | B | W | B |
| A | W | W | B | B | B | B | B | W | B | W | W | B |
| B | W | W | W | W | W | W | W | W | W | W | B | B |
| F | B | B | B | B | B | B | B | B | B | B | B | B |

Flip-flop 149 latches the black or white data from the B/W decision PROM 147. The SHIFT pulse is inverted by an inverter 151 so that data is latched into the flip-flop 149 at the time of the falling edge of a SHIFT pulse. This assures that the black or white data is stable before it is latched. The black data in flip-flop 149 is then sent to finder logic circuitry (not shown) for further data processing.

The invention thus provides a system and method for enhancing multi-level two-dimensional digital data. In a preferred embodiment each signal pulse in successive scans of signal pulses, representative of a scanned character image, is quantized into a multi-bit coded signal having an associated one of a plurality of levels of quantization. Scans of multi-bit coded signals are stored in shift registers to form a preselected configuration of coded signals, including a center signal. Each center signal is selectively compared in a first group of PROMs with each of a plurality of subregions of multi-bit coded signals in the preselected configuration to develop a plurality of comparison codes. The comparison codes are selectively compared in a second group of PROMs to develop horizontal and vertical axis codes. The horizontal and vertical axis codes are then compared in a final PROM to determine whether the multi-bit coded center signal should be turned black or white.

While the salient features of the invention have been illustrated and described, it should be readily apparent to those skilled in the art that many changes and modifications can be made in the system and method of the invention presented without departing from the spirit and true scope of the invention. Accordingly, the present invention should be considered as encompassing all such changes and modifications of the invention that fall within the broad scope of the invention as defined by the appended claims.

What is claimed is:

1. In an optical character reader including a video camera for optically scanning a character on a document to develop successive scans of analog pixel signals representative of the character image being scanned, a video enhancement system comprising:

means for converting each analog pixel signal into a multi-bit pixel signal having an associated one of a plurality of levels of quantization;

means for storing scans of multi-bit pixel signals to form a preselected configuration of multi-bit pixel signals including a multi-bit center pixel signal;

first means for comparing said center pixel with each of a plurality of subregions of multi-bit pixel signals in said preselected configuration to develop a plurality of comparison codes;

second means for selectively comparing said comparison codes to develop a plurality of second codes; and third means for comparing said second codes to determine whether said center pixel signal should be a first value or a second value;

said plurality of subregions of multi-bit pixel signals comprising the respective two multi-bit pixel signals to the left of, to the right of, above and below the center pixel signal; and said first means comprising:

a first PROM for comparing the center pixel signal with the two multi-bit pixel signals to the left of the center pixel signal;

a second PROM for comparing the center pixel signal with the two multi-bit pixel signals to the right of the center pixel signal;

a third PROM for comparing the center pixel signal with the two multi-bit pixel signals above the center pixel signal; and a fourth PROM for comparing the center pixel signal with the two multi-bit pixel signals below the center pixel signal, each of the first, second, third and fourth PROMs outputting a comparison code as a function of its determination as to whether the center pixel signal is possibly one of the two or three highest level multi-bit pixel signals of a character segment.

2. The system of claim 1 wherein said second means comprises:

a fifth PROM for comparing the comparison codes from said first and second PROMs; and a sixth PROM for comparing the comparison codes from said third and fourth PROMs, each of the fifth and sixth PROMs outputting a second code as a function of its determination as to whether the center pixel signal is possibly one of the two or three highest multi-bit pixel signals of a character segment.

3. The system of claim 2 wherein said third means comprises:

a seventh PROM responsive to the second codes from said fifth and sixth PROMs for deciding whether the center pixel signal should be a first value or a second value.

4. The system of claim 3 wherein:

said converting means is an analog-to-digital converter for converting each analog pixel signal into a multi-bit pixel signal having an associated one of eight levels of quantization.

5. The system of claim 4 wherein:

said storing means is an array of shift registers.

* * * * *